US009835317B2

(12) United States Patent
Yuan et al.

(10) Patent No.: US 9,835,317 B2
(45) Date of Patent: Dec. 5, 2017

(54) LUMINAIRE UTILIZING WAVEGUIDE

(71) Applicant: Cree, Inc., Durham, NC (US)

(72) Inventors: Zongjie Yuan, Libertyville, IL (US); Corey J. Goldstein, Mt. Pleasant, WI (US); Kurt S. Wilcox, Libertyville, IL (US)

(73) Assignee: Cree, Inc., Durham, NC (US)

( * ) Notice: Subject to any disclaimer, the term of this patent is extended or adjusted under 35 U.S.C. 154(b) by 0 days.

(21) Appl. No.: 15/060,354

(22) Filed: Mar. 3, 2016

(65) Prior Publication Data
US 2016/0187555 A1    Jun. 30, 2016

Related U.S. Application Data

(63) Continuation-in-part of application No. PCT/US2014/030017, filed on Mar. 15, 2014, and a continuation-in-part of application No. 14/485,609, filed on Sep. 12, 2014, and a continuation-in-part of application No. 14/657,988, filed on Mar. 13, 2015, now Pat. No. 9,709,725, and a continuation-in-part of application No. 29/496,754, filed on Jul. 16, 2014, now Pat. No. Des. 764,091.

(60) Provisional application No. 62/301,559, filed on Feb. 29, 2016, provisional application No. 62/301,572, filed on Feb. 29, 2016, provisional application No. 62/005,965, filed on May 30, 2014, provisional application No. 62/025,436, filed on Jul. 16, 2014, provisional application No. 62/025,905, filed on Jul.
(Continued)

(51) Int. Cl.
F21V 8/00        (2006.01)
F21V 21/116      (2006.01)
F21S 8/08        (2006.01)
F21W 131/103     (2006.01)
F21V 29/51       (2015.01)
F21Y 115/10      (2016.01)
F21Y 113/13      (2016.01)

(52) U.S. Cl.
CPC .......... F21V 21/116 (2013.01); F21S 8/086 (2013.01); G02B 6/002 (2013.01); G02B 6/0045 (2013.01); F21V 29/51 (2015.01); F21W 2131/103 (2013.01); F21Y 2113/13 (2016.08); F21Y 2115/10 (2016.08); G02B 6/0036 (2013.01)

(58) Field of Classification Search
None
See application file for complete search history.

(56) References Cited

U.S. PATENT DOCUMENTS 3,372,740 A    3/1968   Kastovich et al.
5,676,457 A    10/1997  Simon
(Continued)

OTHER PUBLICATIONS

International Search Report and Written Opinion, dated Apr. 20, 2017, for International Application No. PCT/US17/20014, filed Feb. 28, 2017, Applicant, Cree, Inc. (14 pages).
(Continued)

Primary Examiner — Uyen Chau N Le
Assistant Examiner — Chad Smith
(74) Attorney, Agent, or Firm — McCracken & Gillen LLC

(57) ABSTRACT

According to one aspect, an optical waveguide comprises a plurality of coupling cavities for directing light into a waveguide body spaced from a particular point. Further, each of the coupling cavities comprises a dimension that varies with distance from the particular point.

20 Claims, 30 Drawing Sheets

Related U.S. Application Data 17, 2014, provisional application No. 62/005,965, filed on May 30, 2014, provisional application No. 60/025,436, filed on Jul. 16, 2014.

(56) References Cited

U.S. PATENT DOCUMENTS

| | | | |
|---|---|---|---|
| 5,839,823 A | 11/1998 | Hou et al. | |
| 5,863,113 A | 1/1999 | Oe et al. | |
| 6,443,594 B1 | 9/2002 | Marshall et al. | |
| 6,554,451 B1 | 4/2003 | Keuper | |
| 7,008,097 B1 | 3/2006 | Hulse | |
| 7,090,370 B2 | 8/2006 | Clark et al. | |
| 7,457,510 B2 * | 11/2008 | Lee | G02B 6/0036 362/612 |
| 7,488,093 B1 | 2/2009 | Huang et al. | |
| 7,534,013 B1 | 5/2009 | Simon | |
| 7,557,781 B2 * | 7/2009 | Chuang | G02B 6/0021 345/102 |
| 7,563,011 B2 * | 7/2009 | Hatjasalo | G02B 6/0036 359/567 |
| 7,566,159 B2 | 7/2009 | Oon et al. | |
| 7,593,615 B2 | 9/2009 | Chakmakjian et al. | |
| 7,628,508 B2 | 12/2009 | Kita et al. | |
| 7,635,205 B2 | 12/2009 | Yu et al. | |
| 7,641,363 B1 | 1/2010 | Chang et al. | |
| 7,736,019 B2 | 6/2010 | Shimada et al. | |
| 7,810,960 B1 | 10/2010 | Soderman et al. | |
| 7,813,131 B2 | 10/2010 | Liang | |
| 8,277,106 B2 | 10/2012 | Van Gorkom et al. | |
| 8,287,152 B2 | 10/2012 | Gill | |
| 8,317,366 B2 | 11/2012 | Dalton et al. | |
| 8,353,606 B2 | 1/2013 | Jeong | |
| 8,382,387 B1 | 2/2013 | Sandoval | |
| 8,408,737 B2 | 4/2013 | Wright et al. | |
| 8,419,224 B2 | 4/2013 | Wan-Chih et al. | |
| 8,434,892 B2 | 5/2013 | Zwak et al. | |
| 8,434,893 B2 | 5/2013 | Boyer et al. | |
| 8,475,010 B2 | 7/2013 | Vissenberg et al. | |
| 8,485,684 B2 | 7/2013 | Lou et al. | |
| 8,547,022 B2 | 10/2013 | Summerford et al. | |
| 8,567,983 B2 | 10/2013 | Boyer et al. | |
| 8,573,823 B2 | 11/2013 | Dau et al. | |
| 8,593,070 B2 | 11/2013 | Wang et al. | |
| 9,099,592 B2 | 8/2015 | Derryberry et al. | |
| 2006/0209563 A1* | 9/2006 | Hirota | G02B 6/0016 362/608 |
| 2007/0115569 A1 | 5/2007 | Tang et al. | |
| 2008/0002399 A1 | 1/2008 | Villard et al. | |
| 2008/0007964 A1* | 1/2008 | Lin | G02B 6/0021 362/602 |
| 2008/0285309 A1* | 11/2008 | Fang | G02B 6/0016 362/620 |
| 2010/0238671 A1 | 9/2010 | Catone et al. | |
| 2010/0301360 A1 | 12/2010 | Van De Ven et al. | |
| 2010/0302783 A1 | 12/2010 | Shastry et al. | |
| 2011/0044022 A1 | 2/2011 | Ko et al. | |
| 2011/0233568 A1 | 9/2011 | An et al. | |
| 2011/0305027 A1 | 12/2011 | Ham | |
| 2011/0317436 A1 | 12/2011 | Kuan | |
| 2012/0026728 A1 | 2/2012 | Lou et al. | |
| 2012/0152490 A1 | 6/2012 | Wen et al. | |
| 2012/0287654 A1 | 11/2012 | He et al. | |
| 2012/0287677 A1 | 11/2012 | Wheatley et al. | |
| 2012/0307496 A1 | 12/2012 | Phillips et al. | |
| 2013/0003363 A1 | 1/2013 | Lu et al. | |
| 2013/0128593 A1 | 5/2013 | Luo | |
| 2013/0170210 A1 | 7/2013 | Athalye | |
| 2013/0215612 A1 | 8/2013 | Garcia | |
| 2013/0250584 A1 | 9/2013 | Wang et al. | |
| 2013/0300310 A1 | 11/2013 | Hu et al. | |
| 2013/0343045 A1 | 12/2013 | Lodhie et al. | |
| 2013/0343055 A1 | 12/2013 | Eckert et al. | |
| 2013/0343079 A1 | 12/2013 | Unger et al. | |
| 2014/0029257 A1 | 1/2014 | Boyer et al. | |
| 2015/0055369 A1 | 2/2015 | Tarsa et al. | |
| 2015/0055371 A1 | 2/2015 | van de Ven et al. | |
| 2015/0160396 A1 | 6/2015 | Wilcox et al. | |
| 2015/0253488 A1 | 9/2015 | Wilcox et al. | |

OTHER PUBLICATIONS

International Preliminary Report on Patentability, dated Sep. 20, 2016, for International Application No. PCT/US15/20601, filed Mar. 13, 2015, Applicant, Cree, Inc. (15 pages).

* cited by examiner

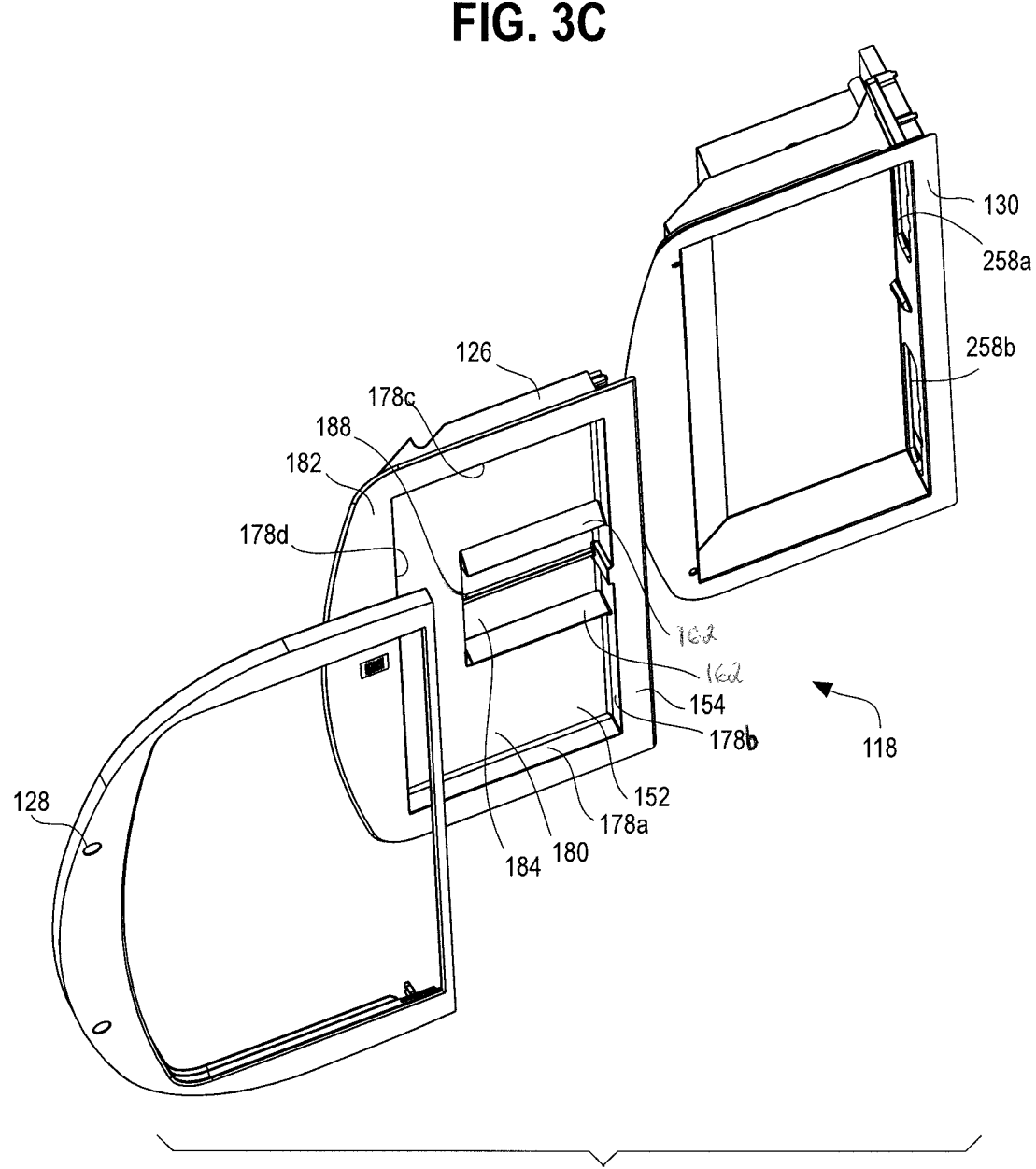

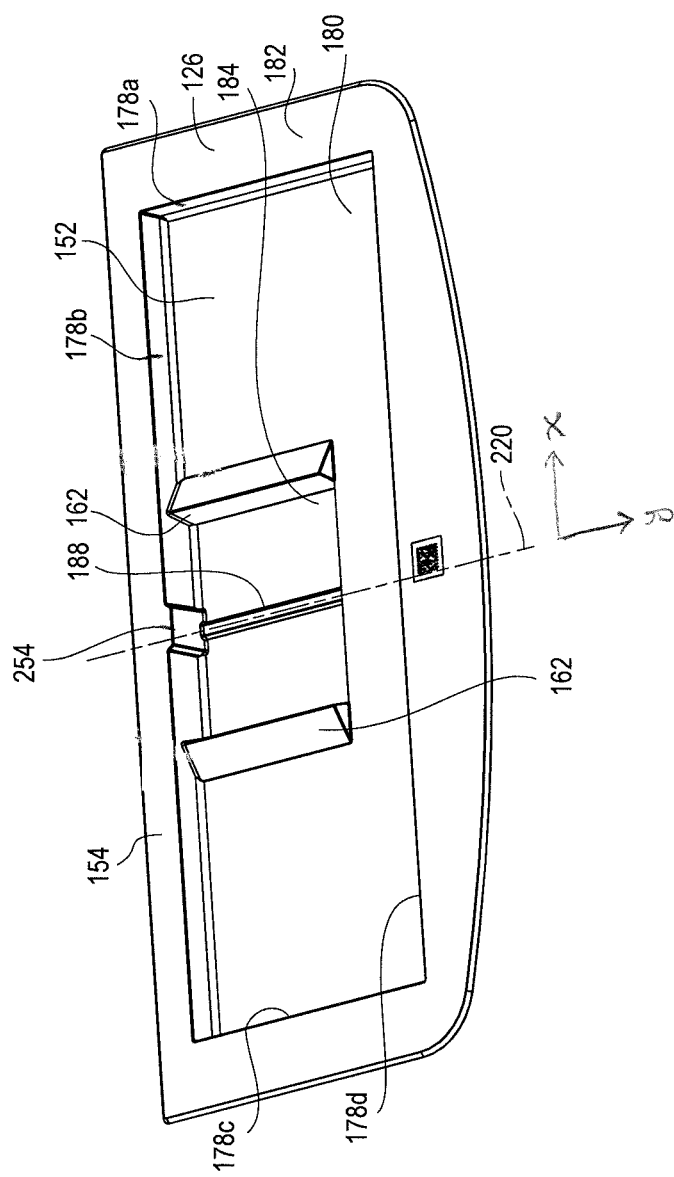

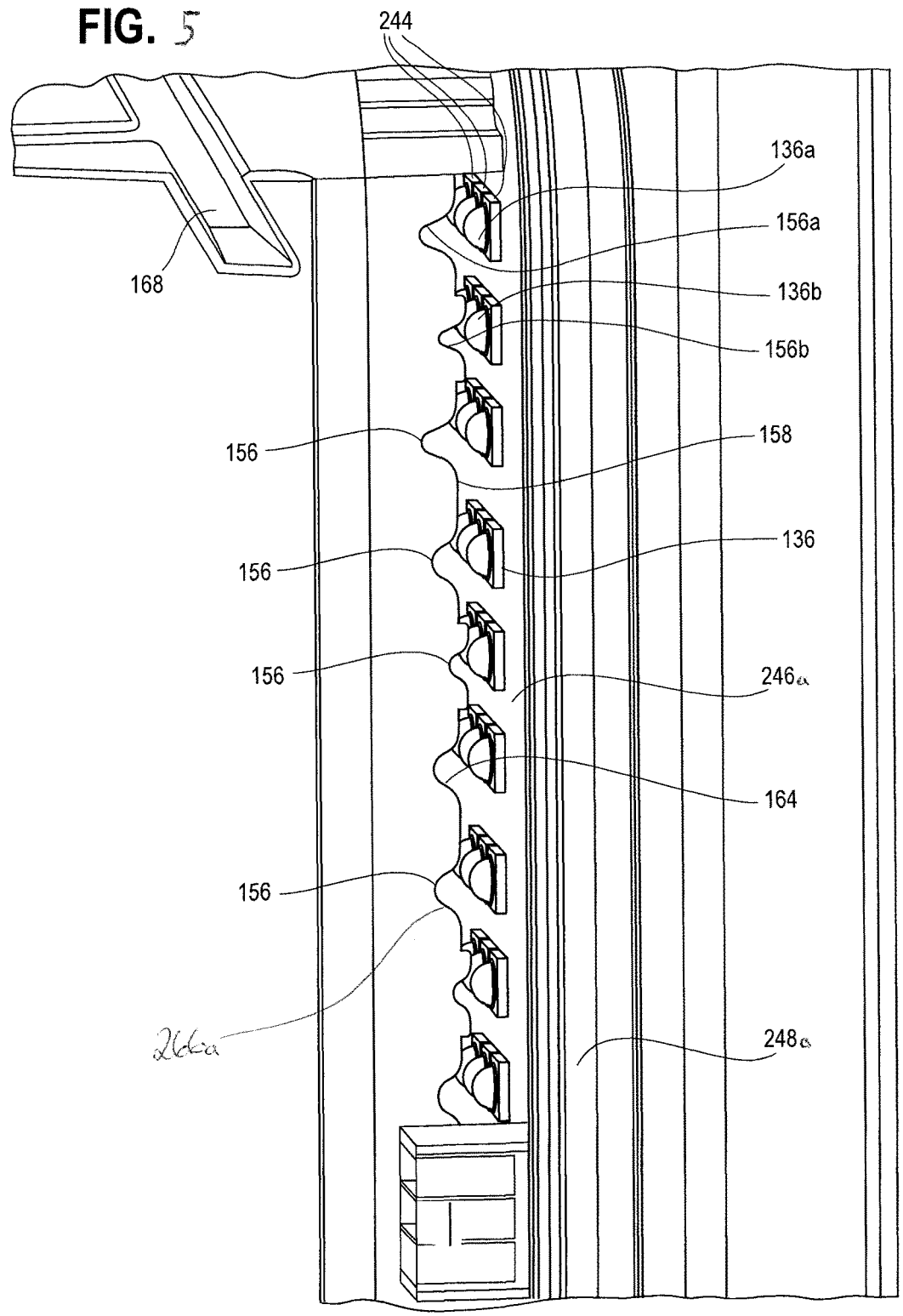

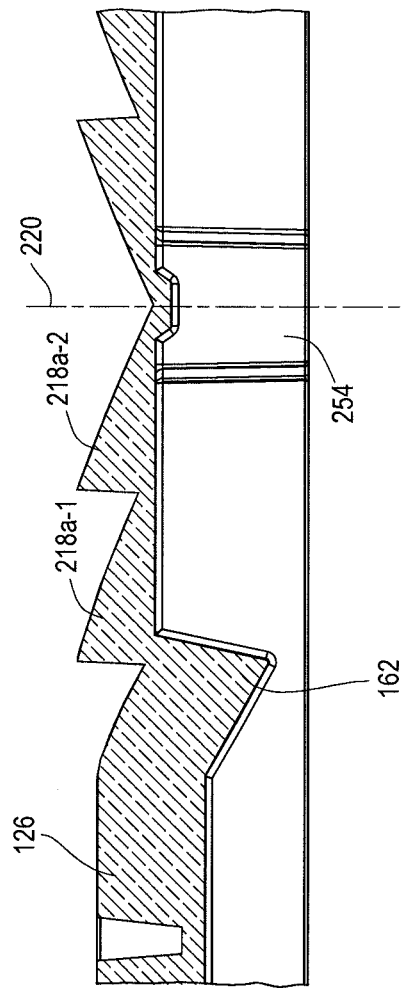

LUMINAIRE UTILIZING WAVEGUIDE

CROSS REFERENCE TO RELATED APPLICATIONS

The present application comprises a continuation-in-part of International Application No. PCT/US2014/30017, filed Mar. 15, 2014, entitled "Optical Waveguide Body", and further comprises a continuation-in-part of U.S. patent application Ser. No. 14/485,609, filed Sep. 12, 2014, entitled "Luminaire Utilizing Waveguide", which claims the benefit of U.S. Provisional Patent Application No. 62/005,965, filed May 30, 2014, entitled "Luminaire Utilizing Waveguide", U.S. Provisional Patent Application No. 62/025,436, filed Jul. 16, 2014, entitled "Luminaire Utilizing Waveguide", and U.S. Provisional Patent Application No. 62/025,905, filed Jul. 17, 2014, entitled "Luminaire Utilizing Waveguide", all owned by the assignee of the present application. The present application further comprises a continuation-in-part of U.S. patent application Ser. No. 14/657,988, filed Mar. 13, 2015, entitled "Luminaire Utilizing Waveguide", which claims the benefit of U.S. Provisional Patent Application No. 62/005,965, filed May 30, 2014, entitled "Luminaire Utilizing Waveguide", U.S. Provisional Patent Application No. 62/025,436, filed Jul. 16, 2014, entitled "Luminaire Utilizing Waveguide", and U.S. Provisional Patent Application No. 62/025,905, filed Jul. 17, 2014, entitled "Luminaire Utilizing Waveguide", all owned by the assignee of the present application. The present application further comprises a continuation-in-part of U.S. Design patent application Ser. No. 29/496,754, filed Jul. 16, 2014, entitled "Roadway Luminaire", and further claims the benefit of U.S. Provisional Patent Application No. 62/301,559, filed Feb. 29, 2016, entitled "Luminaire Utilizing Waveguide", and further claims the benefit of U.S. Provisional Patent Application No. 62/301,572, filed Feb. 29, 2016, entitled "Luminaire Utilizing Light Emitting Diodes", all owned by the assignee of the present application and the disclosures of which are incorporated by reference herein. International Application No. PCT/US2014/30017, filed Mar. 15, 2014, entitled "Optical Waveguide Body", U.S. patent application Ser. No. 14/485,609, filed Sep. 12, 2014, entitled "Luminaire Utilizing Waveguide", and U.S. patent application Ser. No. 14/657,988, filed Mar. 13, 2015, entitled "Luminaire Utilizing Waveguide", are all owned by the assignee of the present application and the disclosures thereof are incorporated by reference herein.

REFERENCE REGARDING FEDERALLY SPONSORED RESEARCH OR DEVELOPMENT

Not applicable

SEQUENTIAL LISTING

Not applicable

FIELD OF THE DISCLOSURE

The present subject matter relates to optical devices, and more particularly, to a luminaire utilizing an optical waveguide.

BACKGROUND

An optical waveguide mixes and directs light emitted by one or more light sources, such as one or more light emitting diodes (LEDs). A typical optical waveguide includes three main components: one or more coupling elements, one or more distribution elements, and one or more extraction elements. The coupling component(s) direct light into the distribution element(s), and condition the light to interact with the subsequent components. The one or more distribution elements control how light flows through the waveguide and is dependent on the waveguide geometry and material. The extraction element(s) determine how light is removed by controlling where and in what direction the light exits the waveguide.

When designing a coupling optic, the primary considerations are: maximizing the efficiency of light transfer from the source into the waveguide; controlling the location of light injected into the waveguide; and controlling the angular distribution of the light in the coupling optic. One way of controlling the spatial and angular spread of injected light is by fitting each source with a dedicated lens. These lenses can be disposed with an air gap between the lens and the coupling optic, or may be manufactured from the same piece of material that defines the waveguide's distribution element(s). Discrete coupling optics allow numerous advantages such as higher efficiency coupling, controlled overlap of light flux from the sources, and angular control of how the injected light interacts with the remaining elements of the waveguide. Discrete coupling optics use refraction, total internal reflection, and surface or volume scattering to control the distribution of light injected into the waveguide.

After light has been coupled into the waveguide, it must be guided and conditioned to the locations of extraction. The simplest example is a fiber-optic cable, which is designed to transport light from one end of the cable to another with minimal loss in between. To achieve this, fiber optic cables are only gradually curved and sharp bends in the waveguide are avoided. In accordance with well-known principles of total internal reflectance, light traveling through a waveguide is reflected back into the waveguide from an outer surface thereof, provided that the incident light does not exceed a particular angle with respect to the surface tangent or, equivalently fall below a certain angle with respect to a surface normal.

In order for an extraction element to remove light from the waveguide, the light must first contact the feature comprising the element. By appropriately shaping the waveguide surfaces, one can control the flow of light across the extraction feature(s). Specifically, selecting the spacing, shape, and other characteristic(s) of the extraction features affects the appearance of the waveguide, its resulting distribution, and efficiency. Hulse U.S. Pat. No. 5,812,714 discloses a waveguide bend element configured to change a direction of travel of light from a first direction to a second direction. The waveguide bend element includes a collector element that collects light emitted from a light source and directs the light into an input face of the waveguide bend element. Light entering the bend element is reflected internally along an outer surface and exits the element at an output face. The outer surface comprises beveled angular surfaces or a curved surface oriented such that most of the light entering the bend element is internally reflected until the light reaches the output face Parker et al. U.S. Pat. No. 5,613,751 discloses a light emitting panel assembly that comprises a transparent light emitting panel having a light input surface, a light transition area, and one or more light sources. Light sources are preferably embedded or bonded in the light transition area to eliminate any air gaps, thus reducing light loss and maximizing the emitted light. The light transition area may include reflective and/or refractive surfaces around and behind each light source to reflect and/or refract and focus the light more efficiently through the light transition area into the light input surface of the light-emitting panel. A pattern of light extracting deformities, or any change in the shape or geometry of the panel surface, and/or coating that causes a portion of the light to be emitted, may be provided on one or both sides of the panel members. A variable pattern of deformities may break up the light rays such that the internal angle of reflection of a portion of the light rays will be great enough to cause the light rays either to be emitted out of the panel or reflected back through the panel and emitted out of the other side.

Shipman, U.S. Pat. No. 3,532,871 discloses a combination running light reflector having two light sources, each of which, when illuminated, develops light that is directed onto a polished surface of a projection. The light is reflected onto a cone-shaped reflector. The light is transversely reflected into a main body and impinges on prisms that direct the light out of the main body.

Simon U.S. Pat. No. 5,897,201 discloses various embodiments of architectural lighting that is distributed from contained radially collimated light. A quasi-point source develops light that is collimated in a radially outward direction and exit means of distribution optics direct the collimated light out of the optics.

Kelly et al. U.S. Pat. No. 8,430,548 discloses light fixtures that use a variety of light sources, such as an incandescent bulb, a fluorescent tube and multiple LEDs. A volumetric diffuser controls the spatial luminance uniformity and angular spread of light from the light fixture. The volumetric diffuser includes one or more regions of volumetric light scattering particles. The volumetric diffuser may be used in conjunction with a waveguide to extract light.

Dau et al U.S. Pat. No. 8,506, 112 discloses illumination devices having multiple light emitting elements, such as LEDs disposed in a row. A collimating optical element receives light developed by the LEDs and a light guide directs the collimated light from the optical element to an optical extractor, which extracts the light.

A.L.P. Lighting Components, Inc. of Niles, Illinois, manufactures a waveguide having a wedge shape with a thick end, a narrow end, and two main faces therebetween. Pyramid-shaped extraction features are formed on both main faces. The wedge waveguide is used as an exit sign such that the thick end of the sign is positioned adjacent a ceiling and the narrow end extends downwardly. Light enters the waveguide at the thick end and is directed down and away from the waveguide by the pyramid-shaped extraction features.

Low-profile LED-based luminaires have recently been developed (e.g., General Electric's ET series panel troffers) that utilize a string of LED components directed into the edge of a waveguiding element (an "edge-lit" approach). However, such luminaires typically suffer from low efficiency due to losses inherent in coupling light emitted from a predominantly Lambertian emitting source such as a LED component into the narrow edge of a waveguide plane.

Smith U.S. Pat. Nos. 7,083,313 and 7,520,650 discloses a light direction device for use with LEDs. In one embodiment, the light direction device includes a plurality of opposing collimators disposed about a plurality of LEDs on one side of the device. Each collimator collimates light developed by the LEDs and directs the collimated light through output surfaces of the collimators toward angled reflectors disposed on a second side opposite the first side of the device. The collimated light reflects off the reflectors out of from the one side perpendicular thereto. In another embodiment, the collimators are integral with a waveguide having reflective surfaces disposed on a second side of the waveguide, and the collimated light is directed toward the reflective surfaces. The light incident on the reflective surfaces is directed from the one side of the device, as in the one embodiment.

In some applications such as roadway, street, or parking lot lighting, it may be desirable to illuminate certain regions surrounding a light fixture while maintaining relatively low illumination of neighboring regions thereof. For example, along a roadway, it may be preferred to direct light in a x-dimension parallel with the roadway while minimizing illumination in a y-dimension toward roadside houses.

SUMMARY

According to one aspect, an optical waveguide comprises a plurality of coupling cavities for directing light into a waveguide body spaced from a particular point. Further, each of the coupling cavities comprises a dimension that varies with distance from the particular point.

According to another aspect, an optical waveguide comprising orthogonal x- and y-dimensions comprises a waveguide body of the optical waveguide that couples with a plurality of LED elements along the x-dimension. Further at least one light extraction member extends in the x-dimension for extracting light out of the waveguide body, and at least one plurality of light extraction members extend in the y-dimension for extracting light out of the waveguide body. Further still, the at least one plurality of light extraction members extends the length of the waveguide body and bisects the at least one light extraction member extending in the x-dimension.

According to a further aspect, an optical waveguide comprising orthogonal x- and y-dimensions comprises at least one first light extraction member extending in the x-dimension for extracting light out of a waveguide body, and at least one plurality of light extraction members extend in the y-dimension for extracting light out of the waveguide body. Further, the at least one plurality of light extraction members forms a portion of the at least one first light extraction member.

Other aspects and advantages of the present invention will become apparent upon consideration of the following detailed description and the attached drawings wherein like numerals designate like structures throughout the specification.

BRIEF DESCRIPTION OF THE DRAWINGS

FIG. 3C is a partial exploded fragmentary isometric view from below of an optical assembly portion of FIG. 1;
FIG. 4 is an isometric view from below of a waveguide body for use in the luminaire of FIG. 1;
FIG. 5 is a partial isometric view from above of the waveguide body of FIG. 4.

FIG. 12 is a fragmentary enlarged cross-sectional view taken generally along the lines 12-12 of FIG. 11;

DETAILED DESCRIPTION

Figure 21:
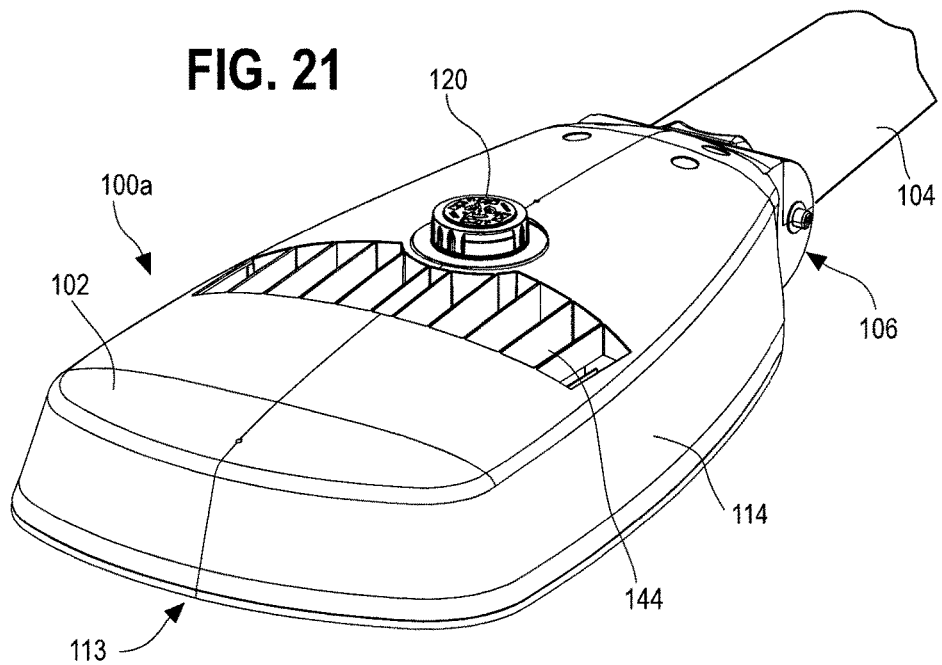
FIG. 21 is an isometric view from above of a luminaire.
Figure 22:
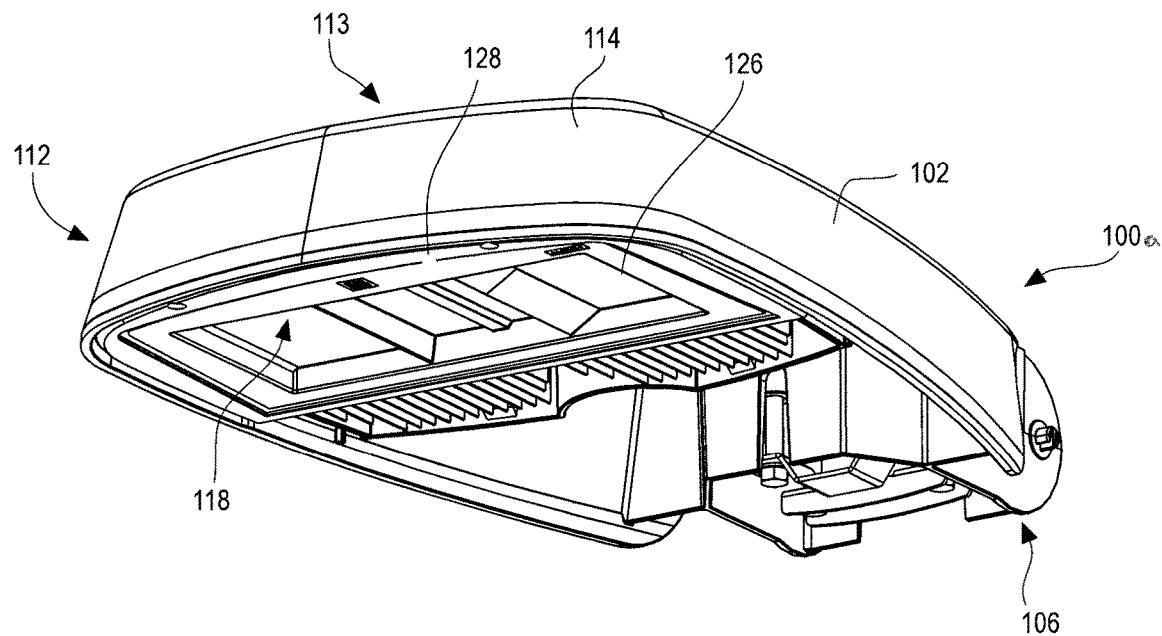
FIG. 22 is an isometric view from below of the luminaire of FIG. 21.
Figure 23:
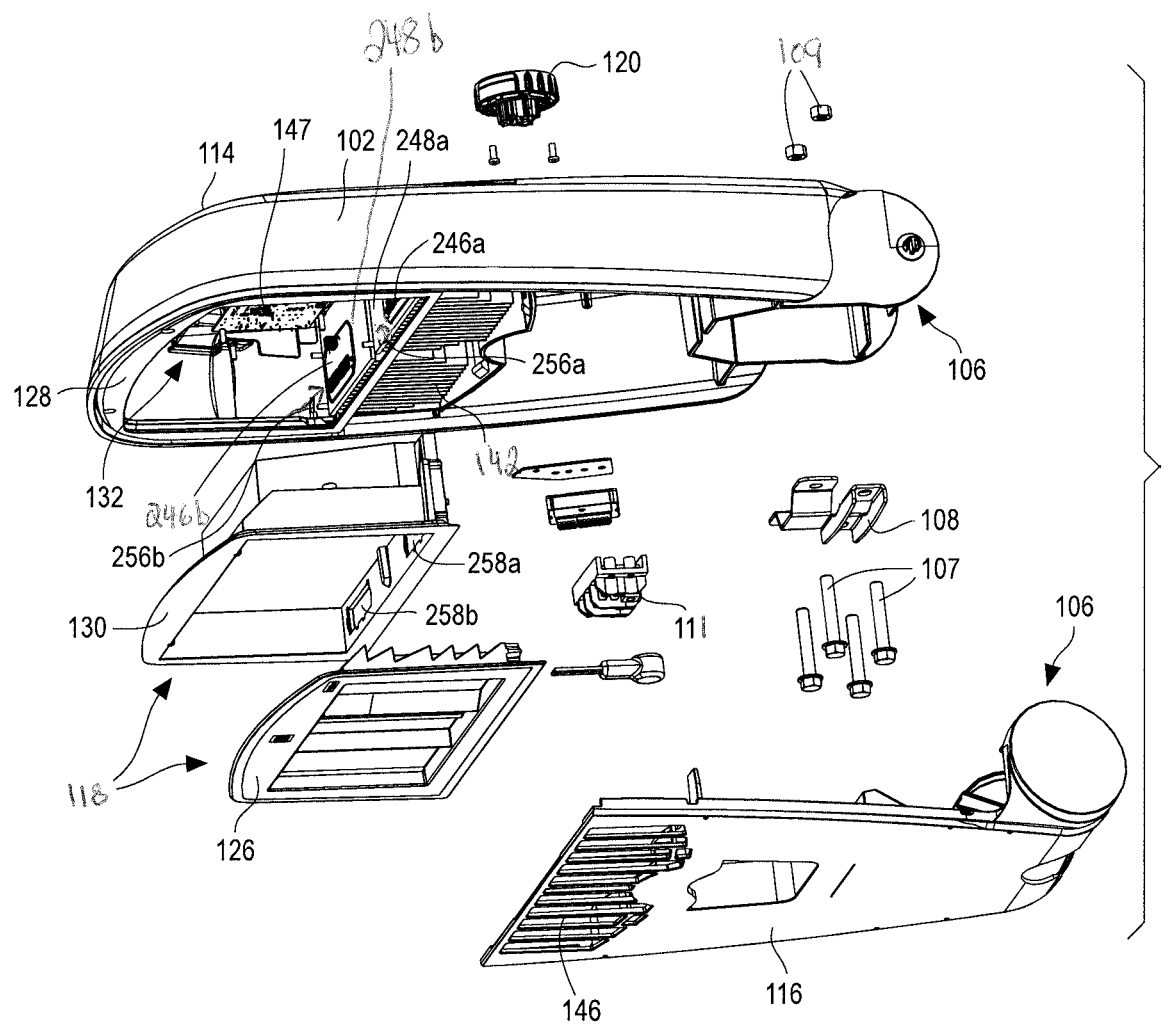
FIG. 23 is an exploded isometric view of the luminaire of FIG. 21.

Referring to FIGS. 1-3C, 21, 22, and 23 two embodiments of a luminaire 100, 100a that utilize a waveguide are illustrated. FIGS. 1-3C illustrate an embodiment of the luminaire 100 having a relatively large size, and FIGS. 21-23 illustrate an alternative embodiment of the luminaire 100a having a relatively smaller size. The embodiments disclosed herein are particularly adapted for use in general lighting applications, for example, as an outdoor roadway (including a driveway) or parking lot luminaire, or as any other indoor or outdoor luminaire. The inner and outer components of the embodiments 100, 100a are substantially identical, except as to the size and configuration of optic assemblies 118 and waveguide bodies 126 utilized therein. Accordingly, only the components of the embodiment 100 are described in detail herein, with the exception that the waveguide bodies 126 and the optic assemblies 118 are separately described.

Figure 1:
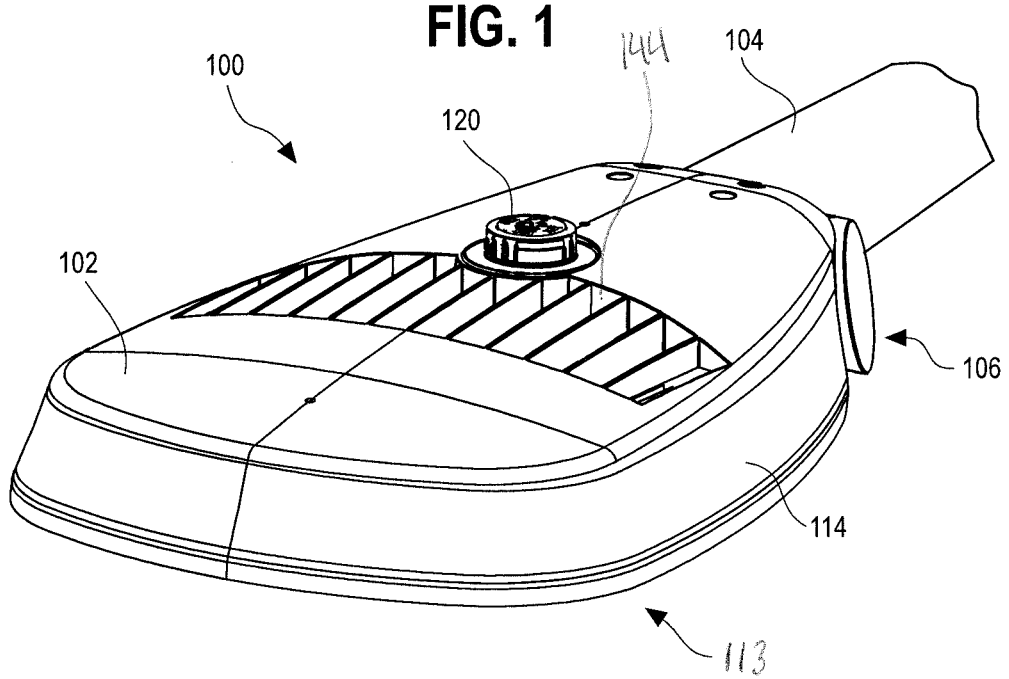
FIG. 1 is an isometric view from above of a luminaire.
Figure 2:
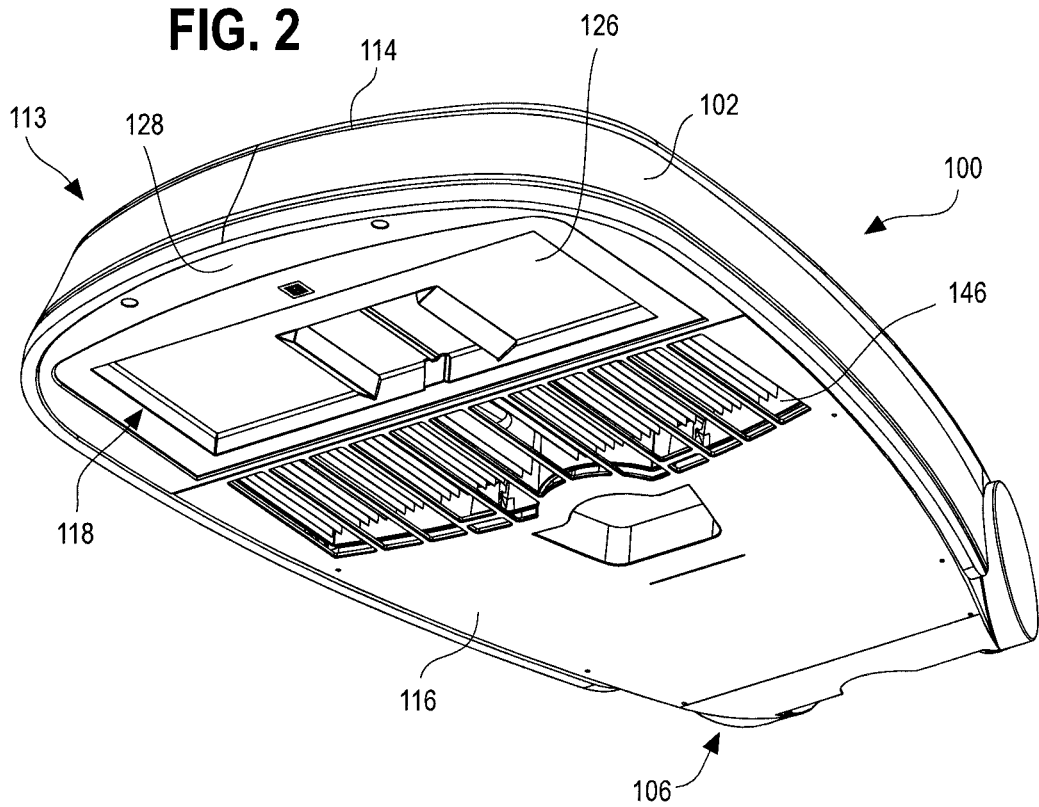
FIG. 2 is an isometric view from below of the luminaire of FIG. 1.
Figure 3A:
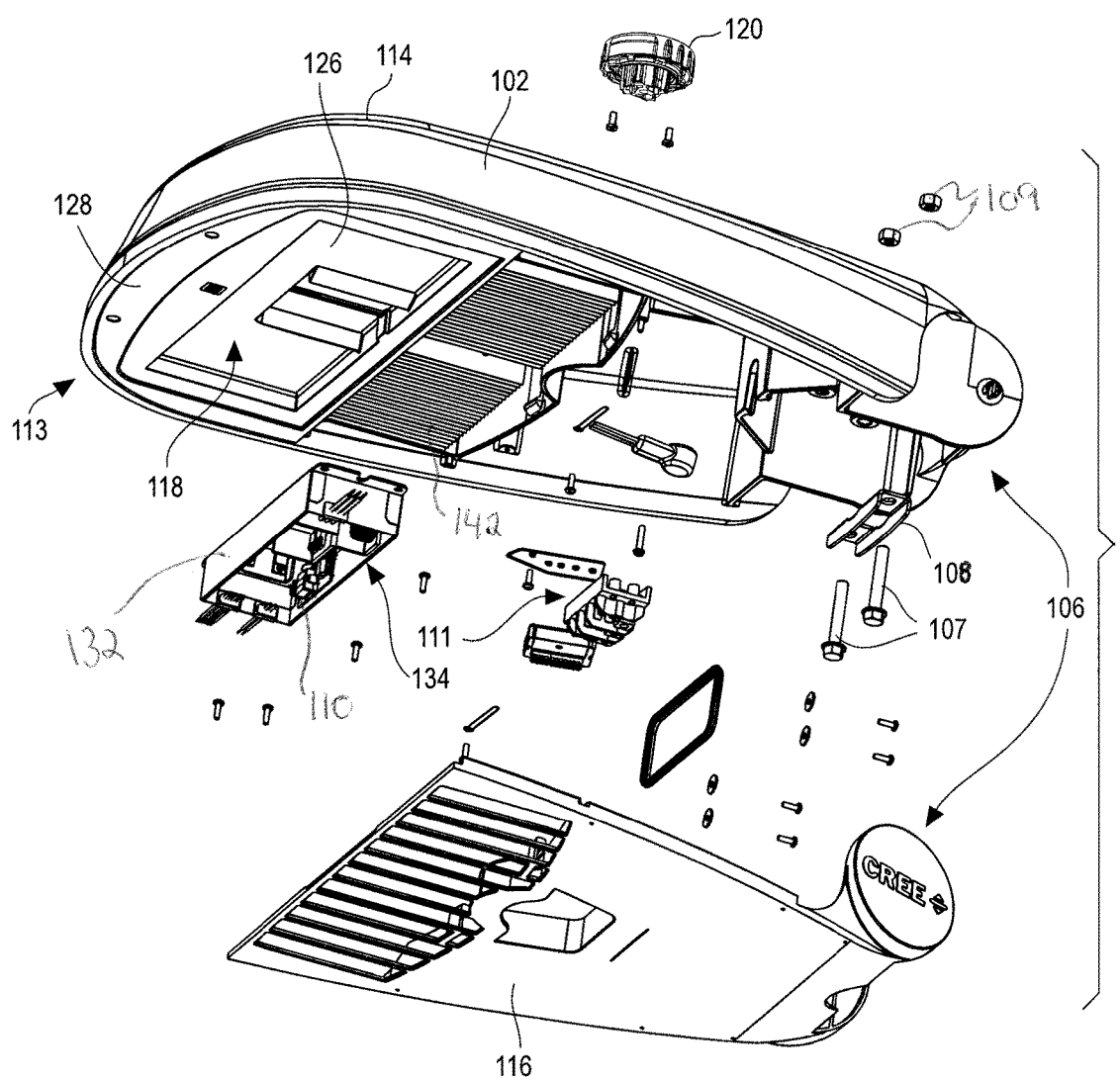
FIG. 3A is an exploded isometric view of the luminaire of FIG. 1.

Each of the luminaires 100, 100a includes a housing 102 adapted to be mounted on a stanchion or pole 104. With reference to FIG. 3A, the housing 102 includes a mounting portion 106 that is sized to accept an end of any of a number of conventional stanchions. Fasteners 107, such as threaded bolts, extend through apertures in side portions of fastening brackets 108 (only one of which is visible in FIG. 3A) and are engaged by threaded nuts 109 disposed in blind bores in an upper portion of the housing 102. The stanchion 104 may be captured between the fastening brackets 108 and a lower surface of the upper portion of the housing to secure the luminaire 100 in fixed position on the end of the stanchion 104. The housing 102 may alternatively be secured to the stanchion 104 by any other suitable means.

Referring to FIGS. 3A and 23, electrical connections (i.e., line, ground, and neutral) are effectuated via a terminal block 111 disposed within the mounting portion 106. Wires (not shown) connect the terminal block 111 to an LED driver circuit 110 in the housing 102 to provide power thereto as noted in greater detail hereinafter.

Referring still to FIGS. 1-3C and 21-23, the luminaire 100 or 100a includes a head portion 113 comprising an upper cover member 114, a lower door 116 secured in any suitable fashion to the upper cover member 114, respectively, and an optic assembly 118 retained in the upper cover member 114. A sensor 120 may be disposed atop the mounting portion 106 for sensing ambient light conditions or other parameters and a signal representative thereof may be provided to the LED driver circuit 110 in the housing 102.

Further details of the luminaires 100, 100a are disclosed in co-pending application Ser. No. 15/060,306, entitled "Luminaire Utilizing Light Emitting Diodes" filed herewith, the disclosure of which is hereby incorporated by reference herein, and Provisional Patent Application Ser. No. 62/301,572 filed Feb. 29, 2016, entitled "Luminaire Utilizing Light Emitting Diodes", the disclosure of which is hereby incorporated by reference herein.

Referring next to FIGS. 3A, 3B, 3C, and 23, the optic assembly 118 comprises an optical waveguide body 126 made of the materials specified hereinbelow or any other suitable materials, a surround member 128, and a reflective enclosure member 130. A circuit housing or compartment 132 with a cover is disposed atop the reflective enclosure member 130, and the driver circuit 110 is disposed in the circuit compartment 132. LED elements 136 are disposed on one or more printed circuit boards (PCBs) 246a, 246b and extend into coupling cavities or features 156 (FIGS. 5, 14, and 20) of the waveguide body 126, as noted in greater detail hereinafter. A heat exchanger 142 is disposed behind the one or more PCBs 246a, 246b to dissipate heat through vents that extend through the luminaire 100 and terminate at upper and lower openings 144, 146. In addition, the terminal block 111 is mounted adjacent the heat exchanger 142 and permits electrical interconnection between the driver circuit 110 and electrical supply conductors (not shown).

The LED elements 136 receive suitable power from the driver circuit 110, which may comprise a SEPIC-type power converter and/or other power conversion circuits mounted on a printed circuit board 147. The printed circuit board 147 may be mounted by suitable fasteners and location pins within the compartment 132 above the reflective enclosure member 130. The driver circuit 110 receives power over wires that extend from the terminal block 111.

Figure 6:
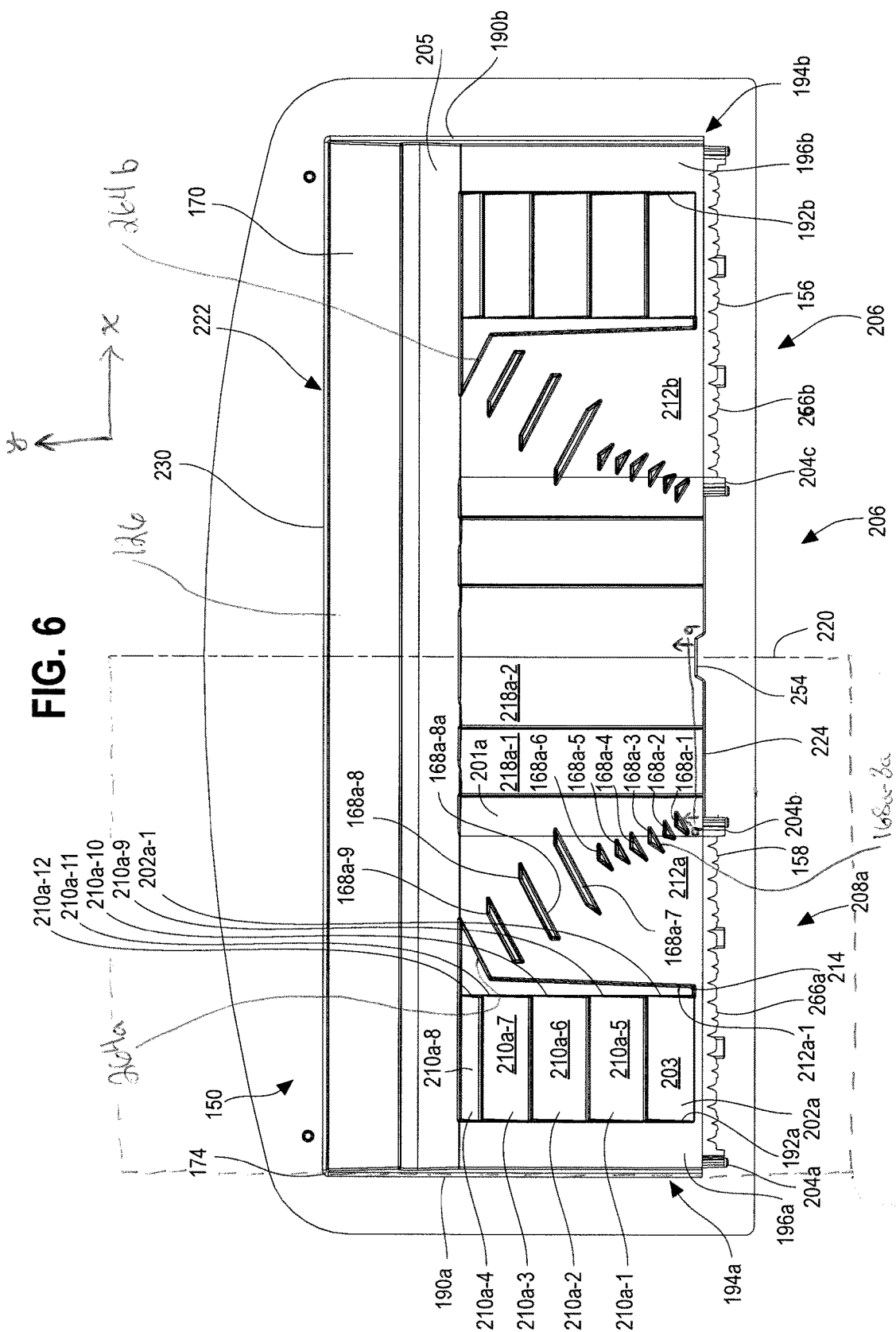
FIG. 6 is a plan view from above of the waveguide body of FIG. 4.

Referring next to FIGS. 4, 5, and 6, an embodiment of the optical waveguide body 126 includes a top surface 150, a bottom surface 152 forming a part of a substrate 154, and at least one, and, more preferably, a plurality of light coupling cavities or features 156 extending into the waveguide body 126 from a coupling end surface 158. Surface elements comprising a number of light redirection elements and light extraction members (described below) are disposed atop the substrate 154 and thus define the top surface 150. Further surface elements comprising an optional plurality of light extraction features 162 (FIG. 4) may be disposed on the bottom surface 152. Alternatively, the bottom surface 152 may be textured or smooth and/or polished, or some combination thereof. LED elements (see FIGS. 5, 14, 20, 27) 136 comprising individual LED light sources are disposed in or adjacent each of the plurality of light coupling cavities 156 as described in greater detail below.

The substrate 154 may be integral with the surface elements disposed on either the top surface 150 or bottom surface 152, or one or more of the surface elements may be separately formed and placed on or otherwise disposed and retained relative to the substrate 154, as desired. The substrate 154 and some or all of the surface elements may be made of the same or different materials. Further, some or all portions of some or all of the embodiments of the waveguide body 126 is/are made of suitable optical materials, such as one or more of acrylic, air, polycarbonate, molded silicone, glass, cyclic olefin copolymers, and a liquid (including water and/or mineral oils), and/or combinations thereof, possibly in a layered arrangement, to achieve a desired effect and/or appearance.

The light developed by the LEDs 136 travels through the waveguide body 126 and is redirected downwardly, by extraction features disposed on the top surface 150 to be described in detail below, and is emitted out the bottom or emission surface 152 of the waveguide body 126. The optional light extraction features 162 on the bottom surface 152, which may comprise two sets of parallel features extending transverse to the width (x-dimension—as indicated in FIGS. 4 and 6) of the waveguide body 126, further facilitate light extraction. It should be noted that there could be a different number (including zero) of bottom surface light extraction features 162, as desired. In any event, the Lambertian or other distributions of light developed by the LED elements 136 are converted into a distribution resulting in an illumination pattern having an extent in the x-dimension and a reach in the y-dimension perpendicular to the x-dimension.

The waveguide body 126 directs light developed by the LED element(s) 136 toward a desired illumination target surface, such as a roadway. The illumination pattern is preferably, although not necessarily, offset in at least the y-dimension with respect to a center of the waveguide body 126. The extent of the illumination pattern on the target surface in the x-dimension is preferably (although not necessarily) greater than the width of the waveguide body 126 and is also preferably (although not necessarily) greater than the extent of the illumination pattern on the target surface in the y-dimension.

The illumination pattern may be modified through appropriate modification of the light extraction features 162 on the bottom surface 152 and the light extraction members and light redirection elements on the top surface 150. The waveguide bodies shown in the illustrated embodiments cause the illumination pattern to be narrower in the y-dimension than in the x-dimension, although this need not be the case. Thus, for example, the light distribution may be equal in the x- and y-dimensions or the light distribution may be greater in the y-dimension than the distribution in the x-dimension. The brightness can be increased or decreased by adding or omitting, respectively, LED elements 136 and/or varying the power developed by the driver circuit 110.

As should be apparent from the foregoing, the reflective enclosure member 130 is disposed above the waveguide body 126 opposite the substrate 154. The reflective enclosure member 130 includes a lower, interior surface that is coated or otherwise formed with a white or specular material. Further, one or more of the surfaces of the waveguide body 126 may be coated/covered with a white or specular material. Light that escapes (or which would otherwise escape) the upper surface 150 of the waveguide body 126 may be thus reflected back into the waveguide body 126 so that light is efficiently extracted out of the substrate 154. The lower surface of the reflective enclosure 130 may have other than a planar shape, such as a curved surface. In all of the illustrated embodiments, the light emitted out of the waveguide body 126 is preferably mixed such that point sources of light in the LED elements 136 are not visible to a significant extent and the emitted light is controlled and collimated to a high degree.

As seen in FIGS. 4, 5, 6, and 7, each of the plurality of light coupling cavities 156 has an indentation-type shape, although variations in shape may be used to better manage the convergence or divergence of light inside the waveguide, in to improve light extraction. Each light coupling cavity 156 is defined by a surface 164 that is substantially or generally parabolic or bell-curve shaped in cross section (as seen in a cross section taken transverse to the coupling end surface 158 and parallel to the bottom surface 152), as shown in such FIGS. Each cavity 156 may alternatively have the general shape of a triangular prism or tapered triangular prism (see FIGS. 26 and 27).

Figure 26:
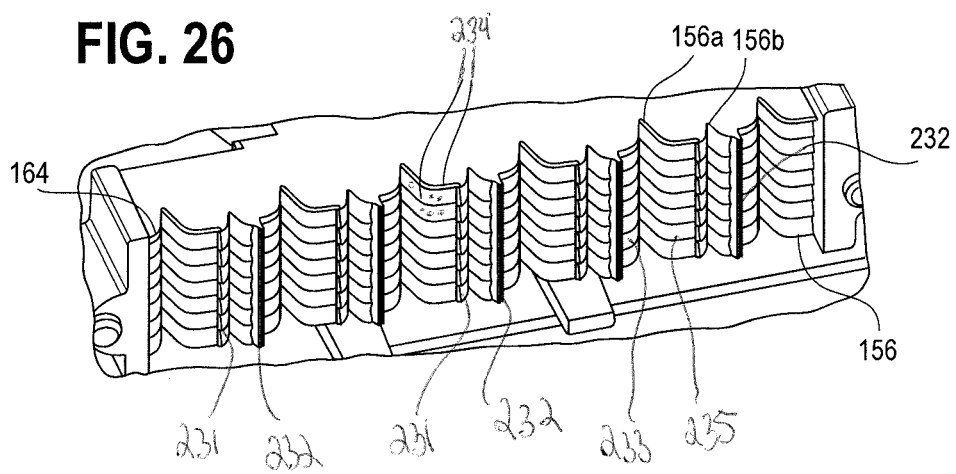
FIG. 26 is a partial isometric view from above of the waveguide body of FIG. 24.
Figure 28:
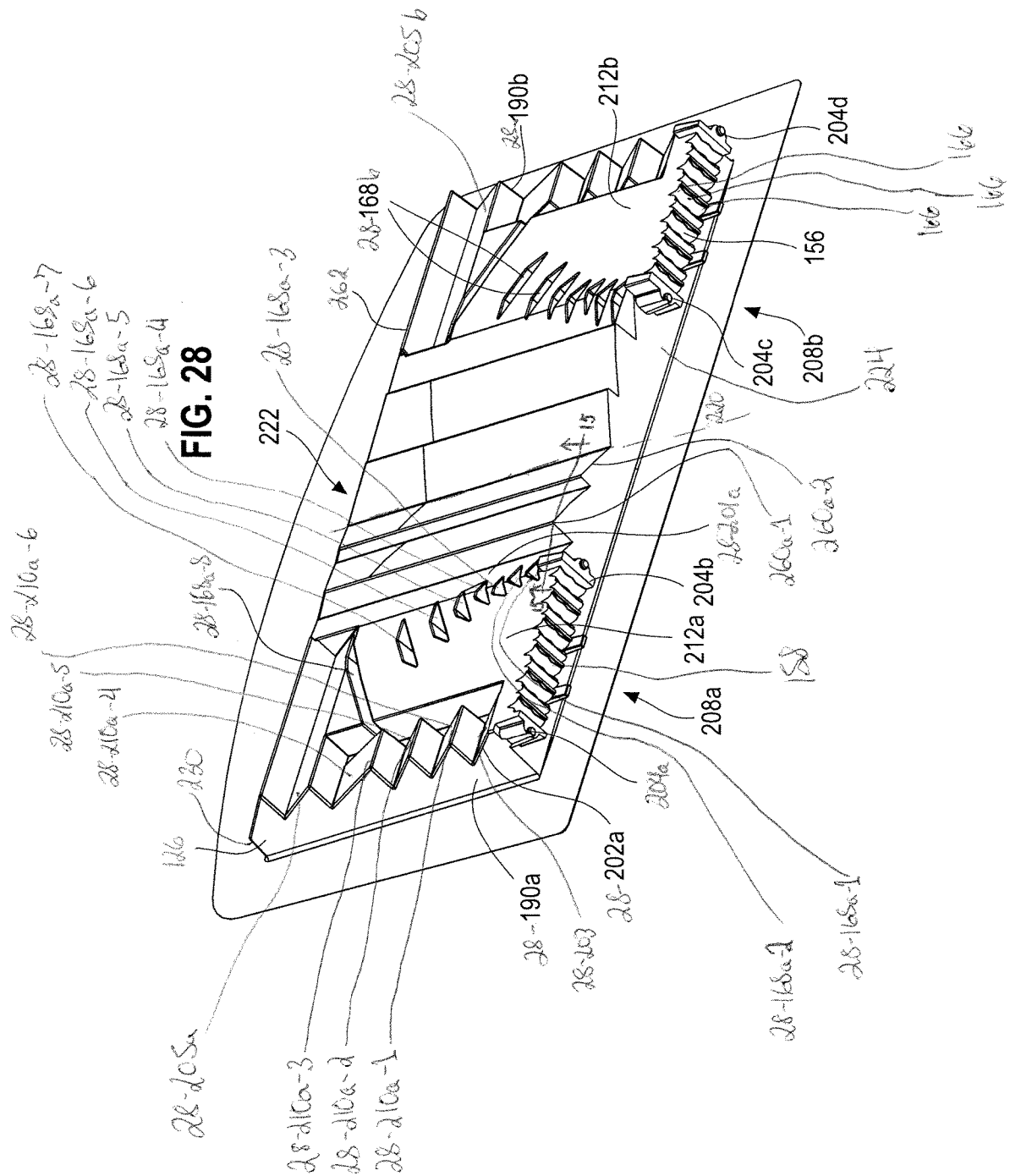
FIG. 28 is an isometric view from above of a waveguide body for use in the luminaire of FIG. 21.

Each surface 164 defining each light coupling cavity 156 may be smooth, textured, curved, or otherwise shaped to affect light mixing and/or redirection. For example, each coupling surface 164 may include spaced bumps or other features that protrude at points along a top-to-bottom extent (i.e., along a z-dimension normal to an x-y plane) of each cavity 156 in such a way as to delineate discrete coupling cavities 166 each provided for and associated with an individual LED element 136 to promote coupling of light into the waveguide body 126 and light mixing, as seen in FIGS. 26 and 28 to be described in detail below. Such an arrangement may take any of the forms disclosed in International Application No. PCT/US14/30017, filed Mar. 15, 2014, entitled "Optical Waveguide Body," incorporated by reference herein.

As seen in FIG. 5, LED elements 136 are disposed within or adjacent the coupling cavities 156 of the waveguide body 126. Each LED element 136 may be a single white or other color LED, or each may comprise multiple LEDs either mounted separately or together on a single substrate or package to form a module including, for example, at least one phosphor-coated or phosphor-converted LED, such as a blue-shifted yellow (BSY) LED, either alone or in combination with at least one color LED, such as a green LED, a yellow LED, a red LED, etc. The LED elements 136 may further include phosphor-converted yellow, red, or green LEDs. One possible combination of LED elements 136 includes at least one blue-shifted-yellow/green LED with at least one blue-shifted-red LED, wherein the LED chip is blue or green and surrounded by phosphor. Any combination of phosphor-converted white LED elements 136, and/or different color phosphor-converted LED elements 136, and/or different color LED elements 136 may be used. Alternatively, all the LED elements 136 may be the same. The number and configuration of LEDs 136 may vary depending on the shape(s) of the coupling cavities 156. Different color temperatures and appearances could be produced using particular LED combinations, as is known in the art. In one embodiment, each light source comprises any LED, for example, an MT-G LED incorporating TrueWhite® LED technology or as disclosed in U.S. patent application Ser. No. 13/649,067, filed Oct. 10, 2012, entitled "LED Package with Multiple Element Light Source and Encapsulant Having Planar Surfaces" by Lowes et al., the disclosure of which is hereby incorporated by reference herein, as developed and manufactured by Cree, Inc., the assignee of the present application. In embodiments, each light source comprises any LED such as the LEDs disclosed in U.S. Pat. No. 8,998,444, and/or U.S. Provisional Patent Application No. 62/262,414, filed Dec. 3, 2015, entitled "Solid State Light Fixtures Suitable for High Temperature Operation Having Separate Blue-Shifted-Yellow/Green and Blue-Shifted-Red Emitters" by Bergmann et al., the disclosures of which are hereby incorporated by reference herein. In another embodiment, a plurality of LEDs may include at least two LEDs having different spectral emission characteristics. If desirable, one or more side emitting LEDs disclosed in U.S. Pat. No. 8,541,795, the disclosure of which is incorporated by reference herein, may be utilized inside or at the edge of the waveguide body 126. In any of the embodiments disclosed herein the LED elements 136 preferably have a Lambertian light distribution, although each may have a directional emission distribution (e.g., a side emitting distribution), as necessary or desirable. More generally, any Lambertian, symmetric, wide angle, preferential-sided, or asymmetric beam pattern LED(s) may be used as the light source(s).

The sizes and/or shapes of the coupling cavities 156 may differ or may all be the same. Each coupling cavity 156 extends into the waveguide body 126 from an end surface 158. However, the end surface 158 defining an open end of each coupling cavity 156 may not be coincident between cavities 156*a*, 156*b*. Thus, in the embodiment illustrated in FIG. 5, each of the coupling cavities 156*a* has a depth that extends farther into the waveguide body 126 than coupling cavities 156*b*. Additionally, each of the coupling cavities 156*b* has an opening at the end surface 158 that is disposed farther from a center of the waveguide body 126 than corresponding openings of coupling cavities 156*a*. The cavities 156*a* are therefore relatively larger than the cavities 156*b*.

In the illustrated embodiment relatively larger BSY LED elements 136*a* (FIG. 27) are aligned with coupling cavities 156*a*, while relatively smaller red LED elements 136*b* are aligned with coupling cavities 156*b*. The arrangement of coupling cavity shapes promotes color mixing in the event that, as discussed above, different color LED elements 136 are used and/or promotes illuminance uniformity by the waveguide body 126 regardless of whether multi-color or monochromatic LEDs are used. In any of the embodiments disclosed herein, other light mixing features may be included in or on the waveguide body 126. Thus, for example, one or more bodies of differing index or indices of refraction than remaining portions of the waveguide body 126 may extend into the waveguide body and/or be located fully within the waveguide body 126.

Figure 14:
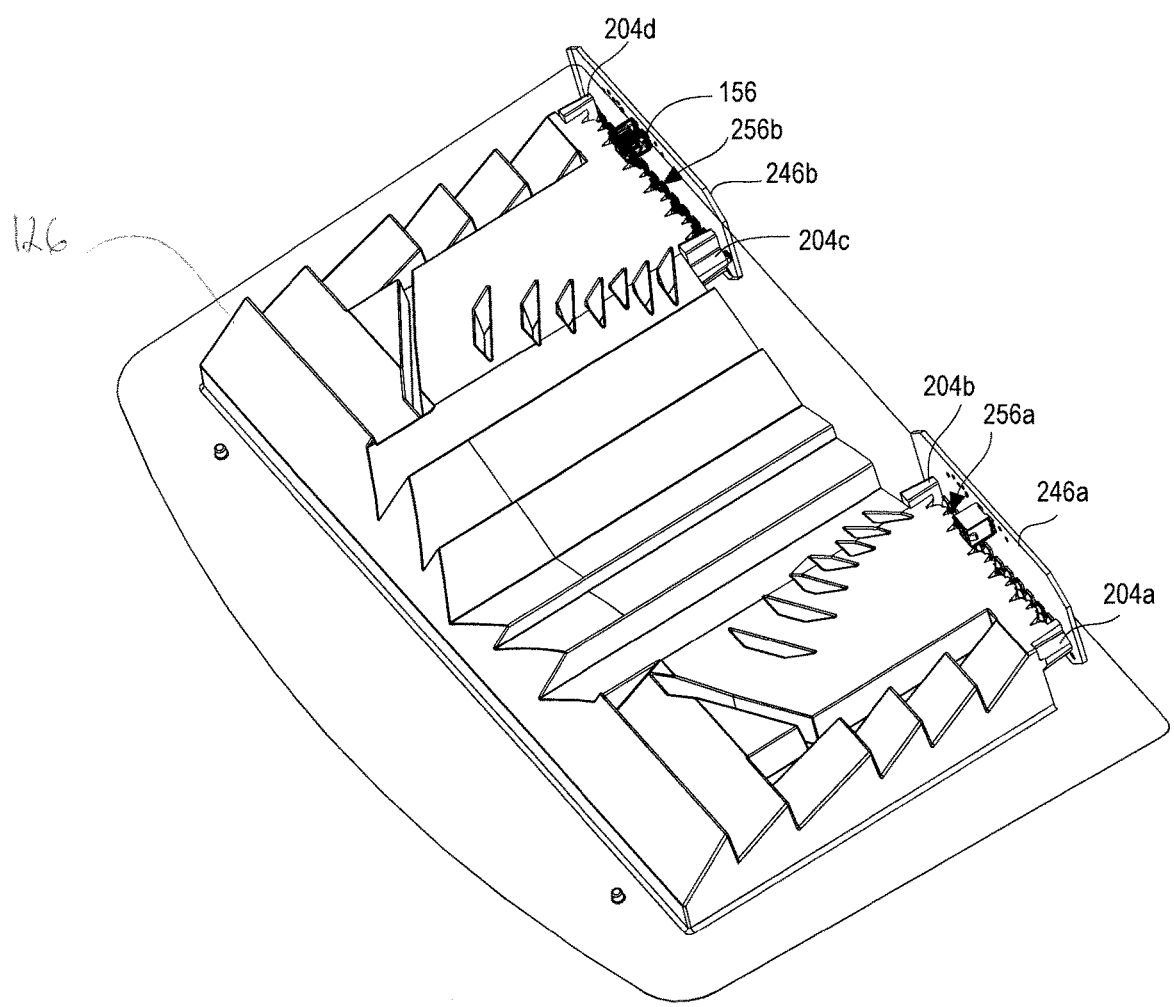
FIG. 14 is an alternate isometric view from above of the waveguide body of FIG. 28 with LED elements coupled thereto on both sides.
Figure 20:
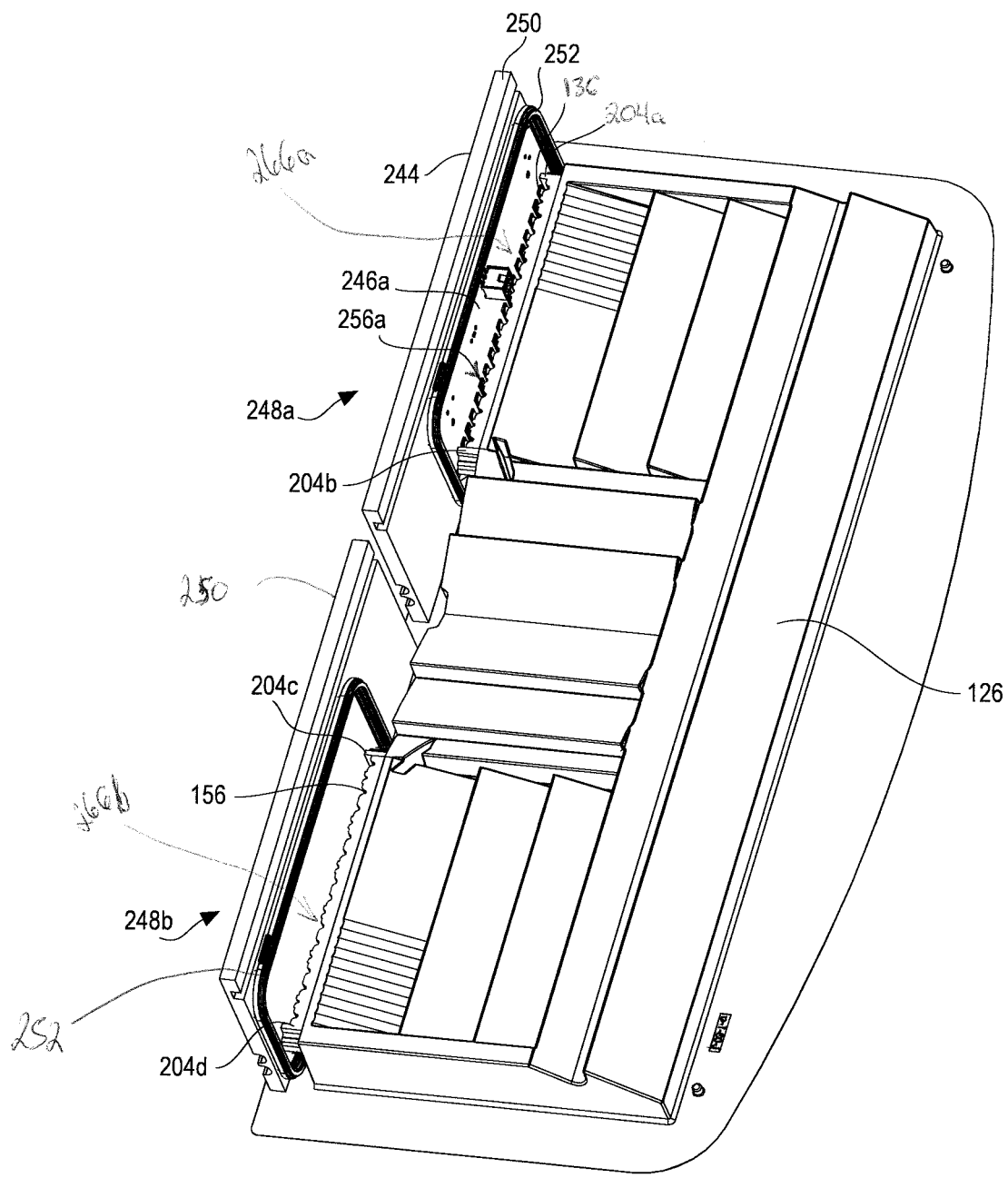
FIG. 20 is an isometric view from above of the waveguide body of FIG. 17 with LED elements coupled thereto on one side.

Referring now to FIGS. 14 and 20, the LED elements 136 may be disposed in the depicted arrangement relative to one another and relative to the light coupling cavities 156. The LED elements 136 may be mounted on separate support structures 244 or some or all of the LED elements 136 may be mounted on a single support structure. In the illustrated embodiment of FIG. 14, first and second subsets 256*a* and 256*b* of the LED elements 136 are disposed on and carried by first and second metal coated printed circuit boards (PCBs) 246*a* and 246*b*, respectively. Each PCB 246*a* and 246*b* is held in place relative to an associated opening 258*a* and 258*b* (see FIGS. 3B and 3C), respectively, of the reflective enclosure member 130 by a holder assembly 248*a* and 248*b* (see FIG. 20), respectively. The holder assemblies 248*a* and 248*b* are preferably identical (although this need not be the case), and hence, only the holder assembly 248*a* will be described in detail. The holder assembly 248*a* comprises a main holding member 250 and a gasket 252. Each PCB 246*a*, 246*b* and/or each holder assembly 248*a*, 248*b* may be held in place relative to the waveguide body 126 by screws, rivets, etc. inserted through the PCB 246*a*, 246*b* and/or holder assembly 248*a*, 248*b* and passing into threaded protrusions 204*a*-204*d* that extend out from the waveguide body 126. Further, screws or fasteners compress the main holding member 250 against the reflective enclosure member 130 with the gasket 252 disposed therebetween and the respective PCB 246*a* aligned with the associated opening 258*a*. Thereby the LED elements 136 are held in place relative to the waveguide body 126 by both the compressive force of the holder assembly 248*a* and the screws, rivets, etc. inserted through the PCB 246*a* and passing into threaded protrusions 204*a*, 204*b*.

Referring again to FIGS. 3B, 3C, 14, and 20, the waveguide body 126 is disposed and maintained within the reflective enclosure member 130 such that the coupling cavities 156 are disposed in a fixed relationship adjacent the openings in the reflective enclosure 130 and such that the LED elements 136 are aligned with the coupling cavities 156 of the waveguide body 126. Each LED receives power from an LED driver circuit or power supply of suitable type, such as a SEPIC-type power converter and/or other power conversion circuits carried by a circuit board that may be mounted by fasteners and/or locating pins atop the reflective enclosure member 130.

Figure 3B:
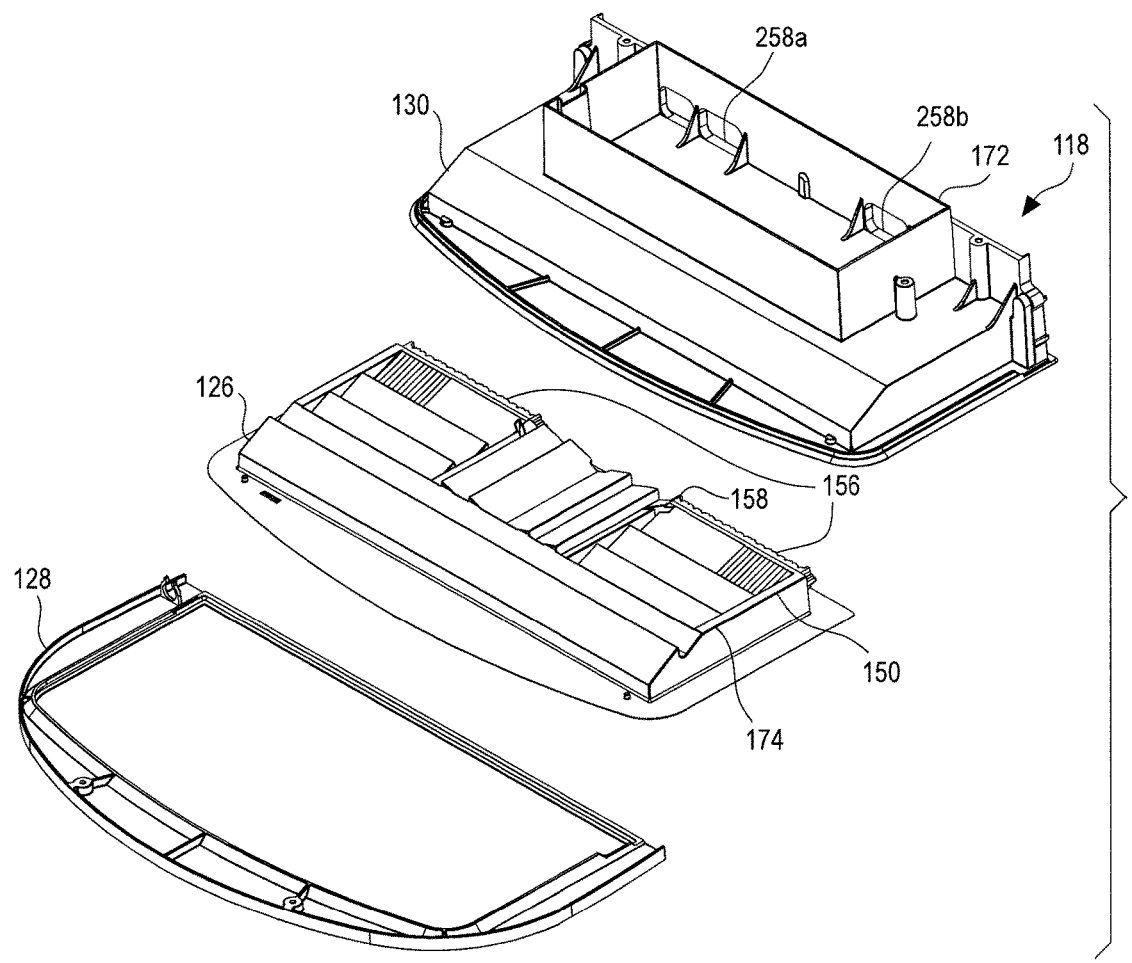
FIG. 3B is a partial exploded fragmentary isometric view from above of an optical assembly portion of FIG. 1.

FIGS. 4, 5, and 6 illustrate the optic assembly 118 in greater detail. A process for fabricating the assembly 118 includes the steps of molding the waveguide body 126, placing the reflective enclosure member 130 onto the waveguide body 126, and overmolding the surround member 128 onto the waveguide body 126 and/or the reflective enclosure member 130 to maintain the reflective enclosure member 130, the waveguide body 126, and the surround member 128 together in a unitary or integral fashion. The optic assembly 118 further includes an upper cover 172 having curved and/or tapered side surfaces to interfit with the housing 114, as shown in FIGS. 3A and 3B. In each luminaire 100, the reflective enclosure member 130 has a size and shape (including tapered or curved side surfaces) to receive closely the respective waveguide body 126 in a nesting fashion. The unitary aspect of the optic assembly 118 and the gaskets 252 provide a seal around the waveguide body 126.

Any of the waveguide bodies disclosed herein may be used in the embodiments of FIGS. 1-3C and 21-23, including the waveguide bodies of FIGS. 4-7, 10-11, 16-17, 24-25, 28-29, and 30-31. For example, embodiments of the luminaire 100 may incorporate waveguide bodies 126 of a particular embodiment to achieve appropriate illumination distributions for desired output light illumination levels. The waveguide bodies of FIGS. 4-6, 10-11, and 16-17 may be fabricated by a molding process, such as multilayer molding, that utilizes a tooling recess common to production of all three waveguide bodies, and using a particular bottom insert in the tooling cavity unique to each of the three waveguide bodies. The insert allows for a central section of each waveguide body 126 to have different extraction members and/or redirection elements while a bottom surface 152 and an outboard portion 174 of an upper surface 150 are common to the waveguides 126. A similar molding process may be utilized for the fabrication of the waveguide bodies shown in FIGS. 24, 25, 28, 29, 30, and 31 as the waveguides shown herein also have commonly shaped bottom surface 152 and outboard portion 174.

The different central sections of the waveguides allow for the illumination distribution pattern produced by the waveguide bodies 126 to be varied. The varied illumination distribution patterns may be compliant with the American Institute of Architects lighting standards that are commonly known in the art. The boundaries of each illumination pattern on the illuminated surface is defined by the threshold of minimum acceptable lighting conditions, which depend on the roadway requirements, such as for a highway luminaire or parking lot luminaire. For example, an embodiment of the waveguide body 126 may provide an illumination pattern on a target surface having a relatively shallow reach, for example, about one to about two times the mounting height of the luminaire 100, 100a in the y-dimension extending away from the luminaire and a relatively long range distribution, for example, about three to about seven times the mounting height of the luminaire 100, 100a in the x-dimension extending at either side of the luminaire 100, 100a transverse to the y-dimension (for a total distribution width in the x-dimension of fourteen times the mounting height). The spacing of the luminaires could therefore be about one to about two times the mounting height along the y-dimension and about three to about seven times the mounting height along the x-dimension.

Alternatively, one or more of the embodiments of the waveguide body 126 may provide an illumination pattern having a relatively shallow reach, for example, about one to about three times the mounting height of the luminaire 100 in the y-dimension and a relatively medium range distribution, for example, about two to about six times the mounting height of the luminaire 100 in the x-dimension, such that the spacing of adjacent luminaires may be about one to about three times the mounting height along the y-dimension and about two to about six times the mounting height along the x-dimension.

Further still, the waveguide bodies 126 may produce an illumination pattern having a relatively mid-range reach, for example, about two to about four times the mounting height of the luminaire 100 in the y-dimension while having a relatively medium range distribution, for example, about 4.7 times the mounting height of the luminaire 100 in the x-dimension, for a spacing of adjacent luminaires of about two to about four times the mounting height along the y-dimension and about one to about five times the mounting height along the x-dimension. The illumination patterns may be different from the descriptions above depending on the number, spacing, colors, and orientation of the LEDs relative to the respective waveguide.

In a further alternative, the luminaire 100 may have a maximum length ranging from about 700 mm to about 800 mm, most preferably from about 730 mm to about 750 mm, a maximum width ranging from about 450 mm to about 550 mm, most preferably from about 490 mm to about 510 mm, and a maximum height ranging from about 100 mm to about 200 mm, most preferably from about 140 mm to about 160 mm. Likewise, the waveguide bodies 126 depicted in FIGS. 4-6, 10-11, 16-17 may be used in a luminaire 100 having a lumen output ranging from about 15,000 lumens to about 30,000 lumens and, most preferably, in luminaires having a lumen output between about 20,000 lumens and about 26,000 lumens.

The luminaire 100a may have a maximum length along the y-dimension (as indicated in FIGS. 4 and 6) ranging from about 600 mm to about 700 mm, most preferably from about 660 mm to about 670 mm, a maximum width along the x-dimension ranging from about 350 mm to about 450 mm, most preferably from about 380 mm to about 400 mm, and a maximum height ranging from about 100 mm to about 200 mm, most preferably from about 120 mm to about 140 mm. Further, the waveguide bodies 126 depicted in FIGS. 24-25, 28-29, and 30-31 may be used in a luminaire 100a having a lumen output ranging from about 8,000 lumens to about 15,000 lumens, and, most preferably, in a luminaire 100a having a lumen output between about 11,000 lumens to about 15,000 lumens.

The waveguide bodies 126 of FIGS. 4-7, 10, 11, 16, 17, 24, 25, 28, 29, 30, and 31 include the bottom surface 152, and the outboard portion 174 of the top surface 150 is common to all of such waveguide bodies 126. The bottom surface 152 illustrated in FIG. 4 is tray-shaped, and includes planar side surfaces 178a-178d disposed about an inner planar surface 180. An outer planar surface 182 extends outwardly from and transverse to the side surfaces 178a-178d. An inner recessed section 184 includes two ridge-shaped light extraction members 162 spaced apart from one another and extending parallel to side surfaces 178a, 178c. A rib 188 protrudes from the inner recessed section 184 preferably along a center line 220 and parallel to the side surfaces 178a, 178c, of the waveguide body 126. The center line 220 along which the rib 188 extends may be offset from center and instead be a particular line dividing the waveguide body 126. Further, the center line 220 discussed below in describing the orientation of various waveguide body 126 features may instead be a particular line dividing the waveguide body 126, such line being substantially centered or offset by a selected amount.

Figure 6A:
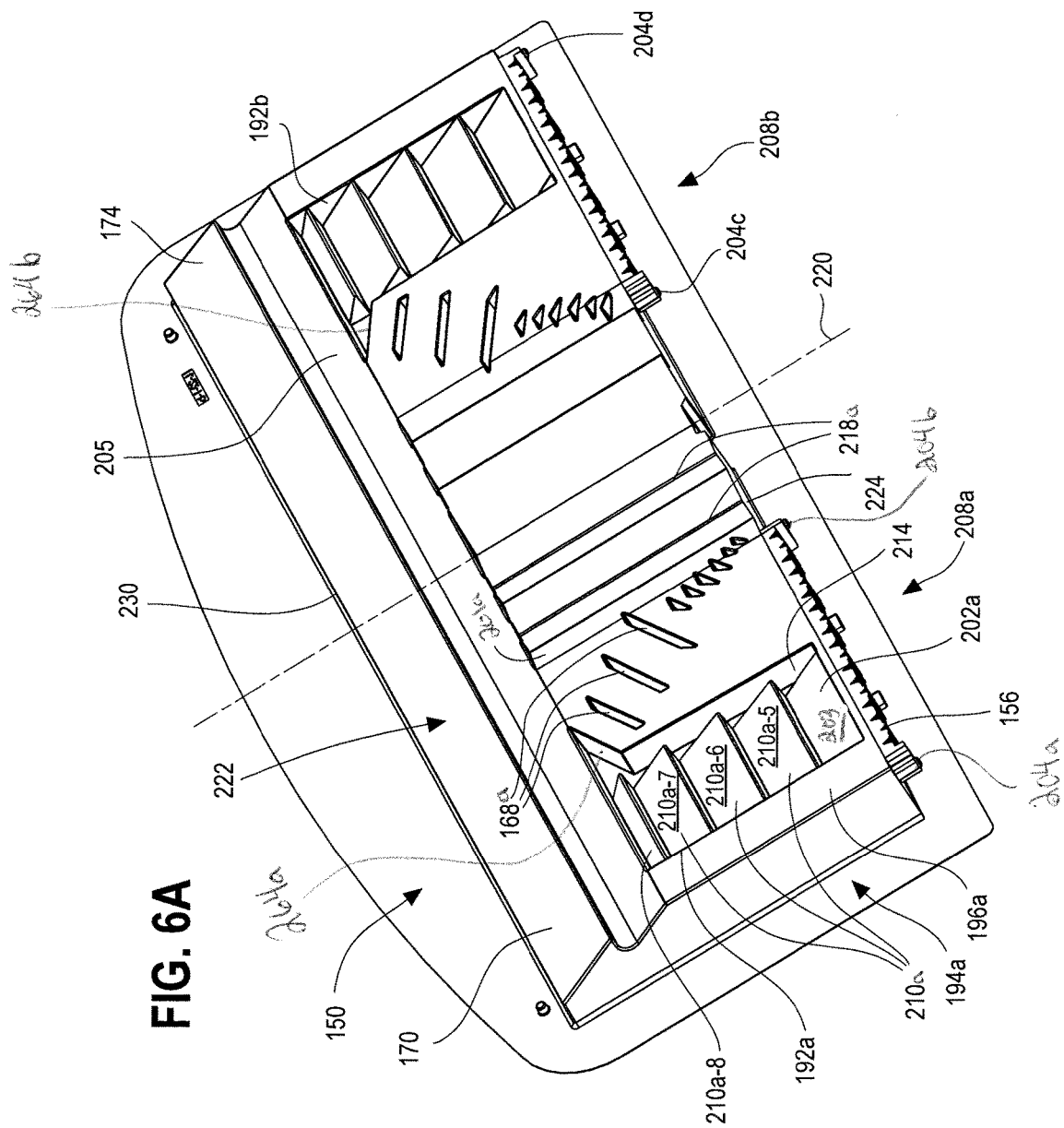
FIG. 6A is an isometric view from above of the waveguide body of FIG. 4.

Referring to FIGS. 6 and 6A, the outboard portion 174 of the upper surface 150 includes first and second opposed side surfaces 190a, 190b along either side of the waveguide body 126. First and second side walls 194a, 194b extend along a portion of the first and second side surfaces 190a, 190b, respectively. Each side wall 194a, 194b includes a planar surface 196a, 196b defined by the respective side surfaces 190a, 190b and the respective inner side surfaces 192a, 192b. The outboard portion 174 further includes an end portion 222 having a wedge-shaped light extraction member 170 and a transition area 205. The end surface 158 includes a planar surface 224 extending between two subsets of coupling cavities or features 266a, 266b that receive the light developed by the LED elements 136. Further, the planar surface 224 on the coupling end 158 is subdivided by a central indentation 254 aligned with the rib 188. The coupling cavities 156 are disposed adjacent to respective side walls 194a, 194b such that light incident on the side walls 194a, 194b is totally internally reflected within the waveguide body 126. During use, first and second groups of light rays from first and second subsets 256*a*, 256*b* of LED elements 136 are reflected off of respective side walls 194*a*, 194*b* back towards the center of the waveguide body 126. These light rays may be extracted through the respective members 162 of the bottom surface 152 toward the center line 220 such that the first and second groups of light rays cross one another at or near the center line 220 and in proximity to the rib 188. Use of total internal reflection along the sides of the waveguide bodies 126 allows for a reduction in the size of the waveguide body along the x-dimension (i.e., the width of the waveguide body 126).

Additionally, the four protrusions 204*a*-204*d* that are contacted by the PCBs 246*a*, 246*b* extend outwardly from the coupling end surface 158 of the waveguide body 126. The portions of the four protrusions 204*a*-204*d* that face toward the coupling cavities 156 may be faceted or filleted, or may be smooth and/or polished.

In any of the embodiments, any sharp corner may be rounded and have a radius of curvature of less than 0.6 mm. Further, the linear extent of at least one extraction feature 170 (FIG. 6) or 262 may extend substantially the entire width (see FIG. 6) or 260 length of the waveguide (see FIG. 24).

Figure 7:
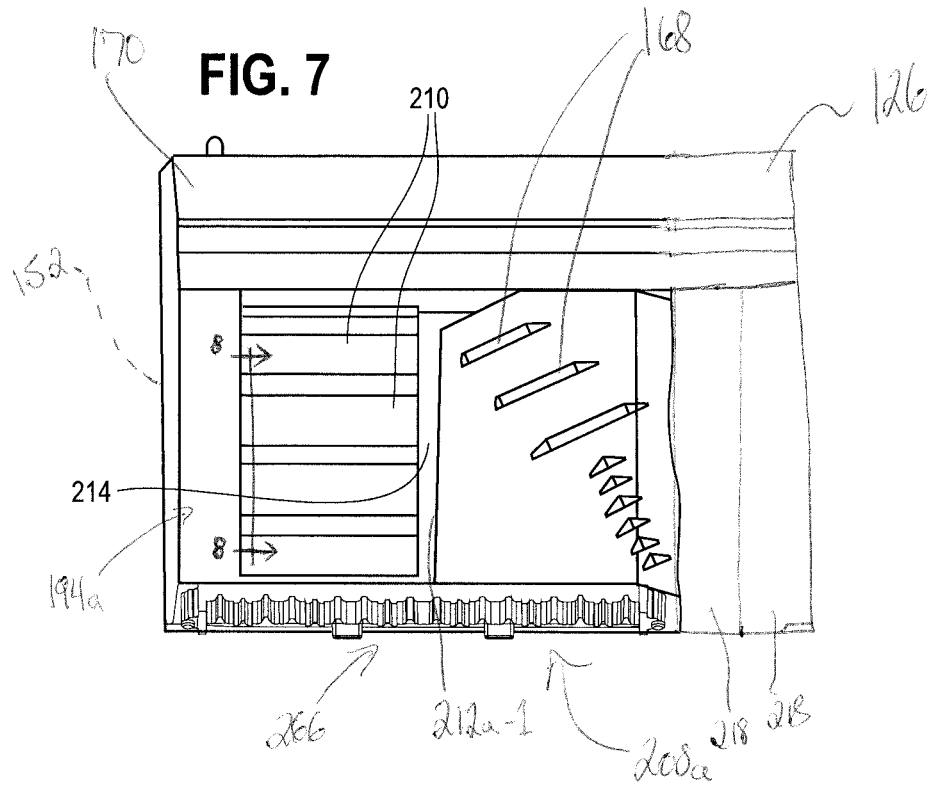
FIG. 7 is a plan view of a section of the waveguide body taken from the box indicated in FIG. 6.
Figure 8:
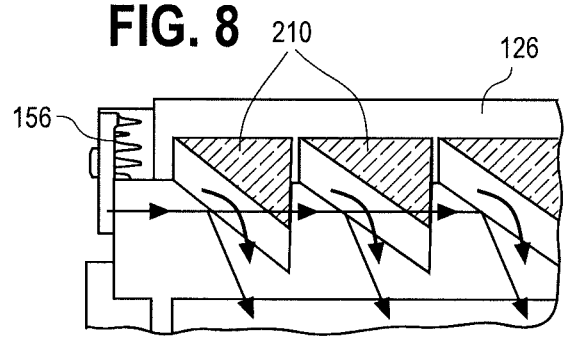
FIG. 8 is a fragmentary enlarged cross-sectional view taken generally along the lines 8-8 indicated in FIG. 7.

A central section 206 is disposed between the side walls 194*a*, 194*b* and extends between a coupling end surface 158 and non-coupling end surface 230 of the outboard portion 174. The central section 206 is preferably (although not necessarily) symmetric about the center line 220 and includes two side sections 208*a*, 208*b* that are preferably mirror images of one another, and hence, only the side section 208*a* will be described in detail. The side section 208*a* includes a first plurality of wedge-shaped light extraction members 210 (shown in FIGS. 6 and 6A as four members 210*a*-1, 210*a*-2, 210*a*-3, and 210*a*-4) extending between the side wall 194*a* and a planar rectangular portion 212*a*. A transition area 202*a* extends between the inner side surface 192*a* and the planar rectangular portion 212*a*. The transition area 202*a* may comprise a sloped surface 203 that may be polished, and/or may include faceting or scalloping on all or a portion of the sloped surface 203, as seen in FIG. 20 in connection with another embodiment. As shown in FIGS. 6, 6A, 7, and 8, each of the plurality of wedge-shaped light extraction members 210 includes sloping light extraction surfaces 210*a*-5, 210*a*-6, 210*a*-7, and 210*a*-8, respectively, similar or identical to the sloped surface 203 of the transition area 202*a*, that together direct light downwardly and out of the waveguide body 126. FIG. 8 is a cross sectional view of the waveguide body 126 taken at plane 8 as indicated in FIG. 7.

Referring again to FIG. 6, 6A, and 7, inner end surfaces 210*a*-9, 210*a*-10, 210*a*-11, 210*a*-12 of the plurality of wedge-shaped light extraction members 210 and inner side surface 202*a*-1 are spaced apart from a facing side wall 212*a*-1 of the planar portion 212*a* to define a gap 214 therebetween. In the illustrated embodiment, the gap 214 is tapered such that the end of the gap 214 nearest the coupling end surface 158 is narrower than the end of the gap nearest the transition area 205. A plurality of light redirection cavities 168 extend into the planar portion 212*a*. In the illustrated embodiment, there are nine cavities 168*a*-1 through 168*a*-9. The cavities 168*a*-1 through 168*a*-6 are substantially or fully triangular in cross-sectional shape (as seen on FIG. 6) whereas the cavities 168*a*-7 through 168*a*-9 are trapezoidal (again, as seen in FIG. 6). Each cavity 168 has a base surface nearest the planar surface 224 (e.g., the base surfaces 168*a*-3*a* and 168*a*-8*a*) that are disposed at one or more angles relative to the planar surface 224. The angle(s) may be equal or unequal and may range between about 5 degrees and about 85 degrees, preferably between about 15 degrees and about 45 degrees, and most preferably between about 25 degrees and about 35 degrees. Remaining side surfaces defining each cavity 168 form a prismatic shape with the base surface associated therewith. The cavities 168 redirect light traveling through the waveguide body 126 laterally within the waveguide body 126 toward the central section 206. In other embodiments, the width, length, and curvature and/or other shape(s) of the light redirection cavities may vary. Further, the planar portion 212*a* may terminate at a linear surface 264 defining a truncated upper corner near the extraction member 210*a*-4. The surface is disposed at an angle relative to the planar surface 224 that is similar or identical to the angle specified above of one of the base surfaces of the cavities 168. Light travelling through the waveguide is redirected at the linear surface 264 in a manner similar to the redirection effected by the cavities 168.

Figure 9:
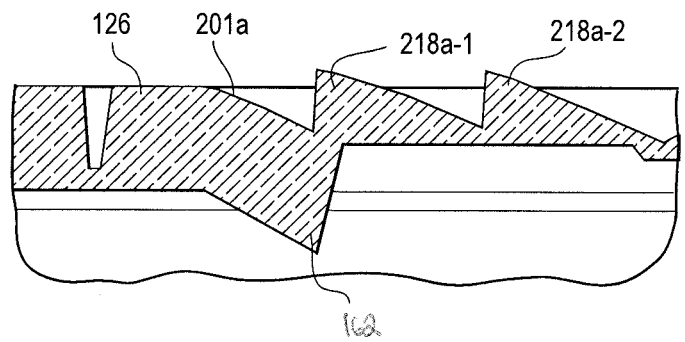
FIG. 9 is a fragmentary enlarged cross-sectional view taken generally along the lines 9-9 indicated in FIG. 6.

A plurality of wedge-shaped light extraction members 218*a*-1, 218*a*-2, and a sloped transition area 201 a are disposed between the planar portion 212*a* and the center line 220, and extend between the coupling end surface 158 and the transition area 205 of the end portion 222. FIG. 9 shows an example cross-sectional geometry of the extraction members 218 and the bottom surface extraction features 162 as indicated in FIG. 6. The transition area 201*a* and the extraction features 218 direct light redirected by the cavities 168 out of the bottom surface 152 of the waveguide body 126. Light is also directed outwardly through the surface 152 by the transition feature 205 and the wedge-shaped extraction member 170. In this embodiment, the transition feature 205 comprises a curved shape, such as a "J" shape, as it meets the wedge-shaped extraction member 170. The geometry of the extraction members 218 and extraction features 162 may be altered to manipulate the illumination pattern produced by the waveguide body 126. Additionally, the extraction members 218 may have the same or similar shapes as the other light extraction features 170, 210, but may differ in size.

Referring now to FIG. 7, the portion of the waveguide body 126 as indicated in FIG. 6 is shown. This portion of the waveguide body 126 includes the waveguide section 208*a*. In an embodiment, the section 208*a* may comprise the entirety of the waveguide body 126. Alternatively, further section(s) that are substantially identical to and/or different than section 208*a* or sections having modified extraction members or redirection cavities as described hereinbelow may be arranged side-by-side for utilization and may together comprise the waveguide body 126. In another embodiment, the sections similar or identical to the section 208*a* may be arranged in a configuration other than side-by-side, such as a square or rectangular configuration with coupling cavity subsets 266 arranged along more than one side surface. In other embodiments, sections may be identical, similar and/or different from other sections.

Referring still to FIG. 7, the section 208*a* comprises different portions that are optically coupled to the LEDs, and depending on the embodiment, the light from the LEDs that is coupled to a portion can be directed (to be redirected again or extracted by another portion), redirected and extracted or extracted by that portion. Each section 208*a* has multiple portions with different features. Eventually the light is extracted to produce an overall or cumulative desired illumination pattern. In this example, the portion of the waveguide body section 208*a* comprises the coupling cavity subset 266 on the coupling cavity end surface 158. Light from the LED subset 256a (as seen in FIG. 14) is directed into the waveguide body 126. The light is thereafter extracted from the waveguide body 126 by at least one of the extraction members 210, 170 in a first direction or along a first dimension (such as the y-dimension). Alternatively, light from the LED subset 256a is redirected by redirection cavities 168 toward light extraction members 218, 170. Light from the LED subset 256a may also be redirected back towards the extraction features 210, 218, 170 by the side wall 194a or the side wall 212a-1. At least one light extraction feature, such as the light extraction feature 218a, directs light in a second direction or along a second dimension different than the first direction or first dimension (such as along the x-dimension). The configuration of the light extraction members 210, 218, 170 and the light redirection cavities 168 acts to direct substantially all of the light out of the bottom surface 152 of the waveguide section 208a. In alternative embodiments, additional subsets of LEDs 256 can be coupled into additional portions of the section 208a to be redirected and extracted, redirected (to be extracted in a different portion of the waveguide body 126 or directly extracted to produce a composite or cumulative desired illumination pattern. Note, subsets of LEDs 256 can be coupled to multiple portions of each section 208a or even across sections depending on the embodiment. In an example embodiment, the optical waveguide comprises the plurality of coupling cavities 156 for coupling light into the waveguide body 126 from the plurality of LEDs 256. The optical waveguide further comprises a first light extraction feature (such as any of the light extraction members 210, 218, 170, 260, and/or 262 described herein) extracting light directly out of the waveguide body 126 in a first direction. Further in this embodiment, the optical waveguide my comprise a light redirection feature (such as redirection cavities 168 described herein) for directing light within the waveguide body 126, and a second light extraction feature (again, such as any of the light extraction members 210, 218, 170, 260, and/or 262 described herein) for extracting redirected light out of the waveguide body 126 in a second direction different than the first direction.

Figure 10:
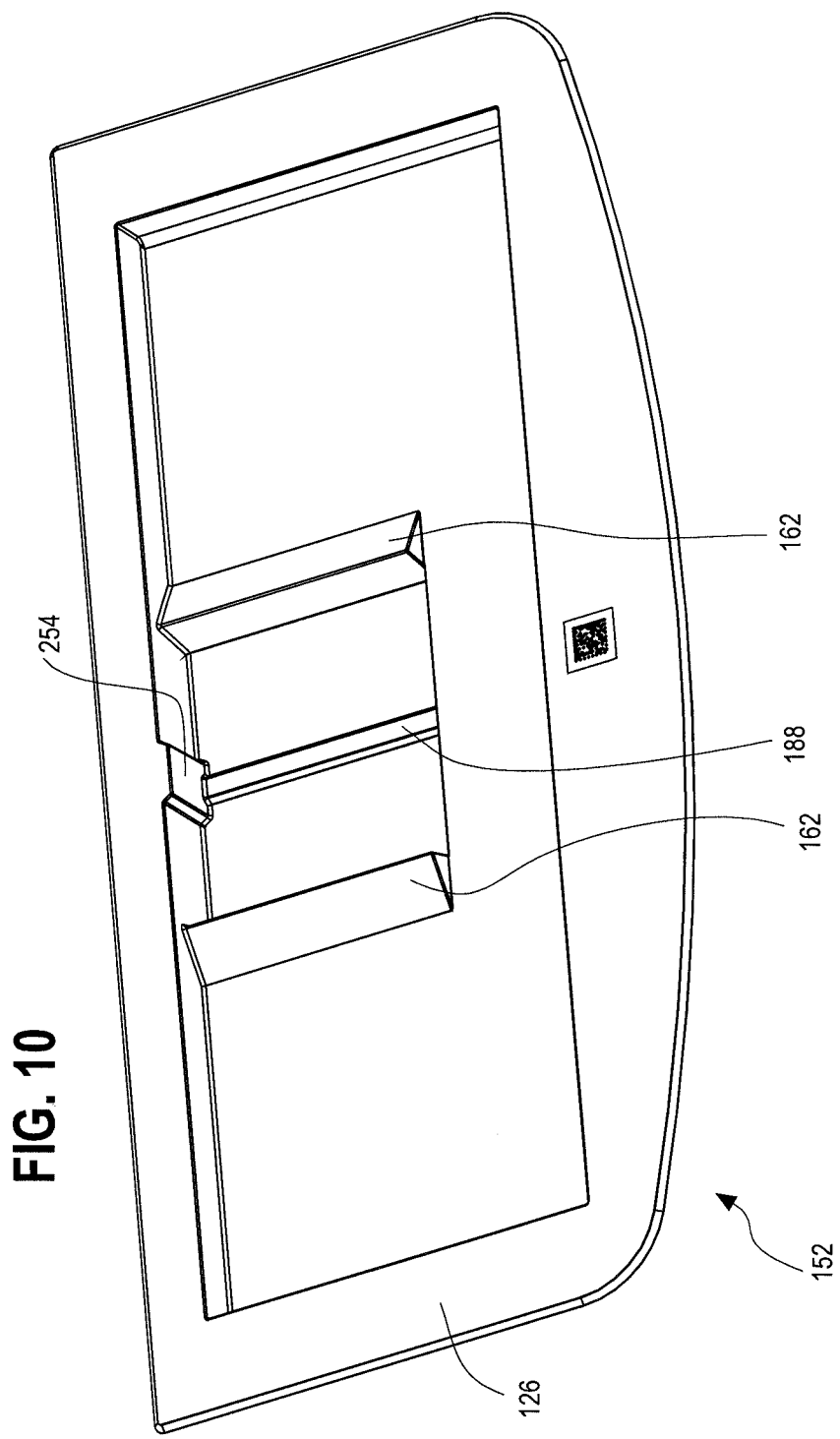
FIG. 10 is an isometric view from below of a waveguide body for use in the luminaire of FIG. 1.
Figure 11:
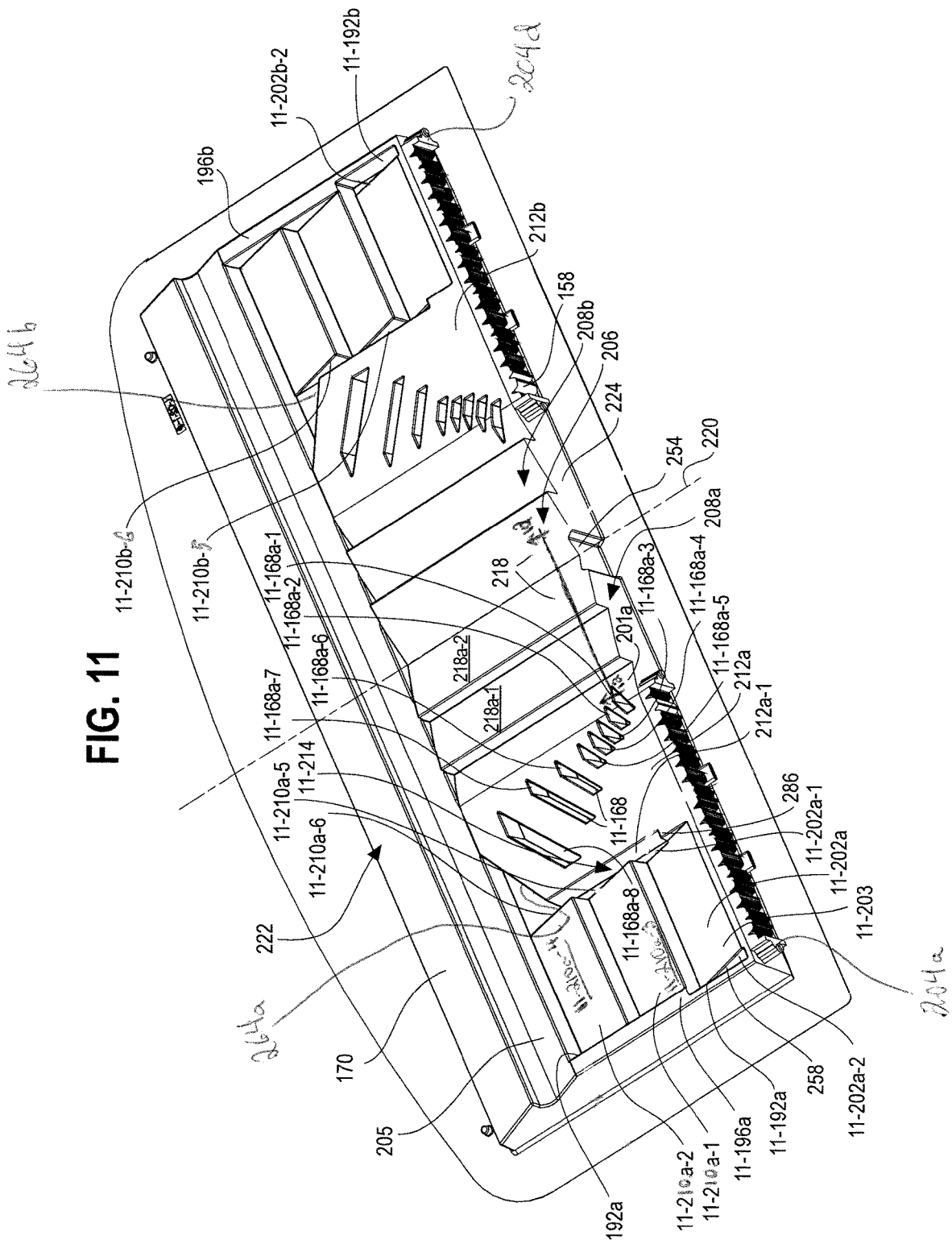
FIG. 11 is an isometric view from above of the waveguide body of FIG. 10.
Figure 11A:
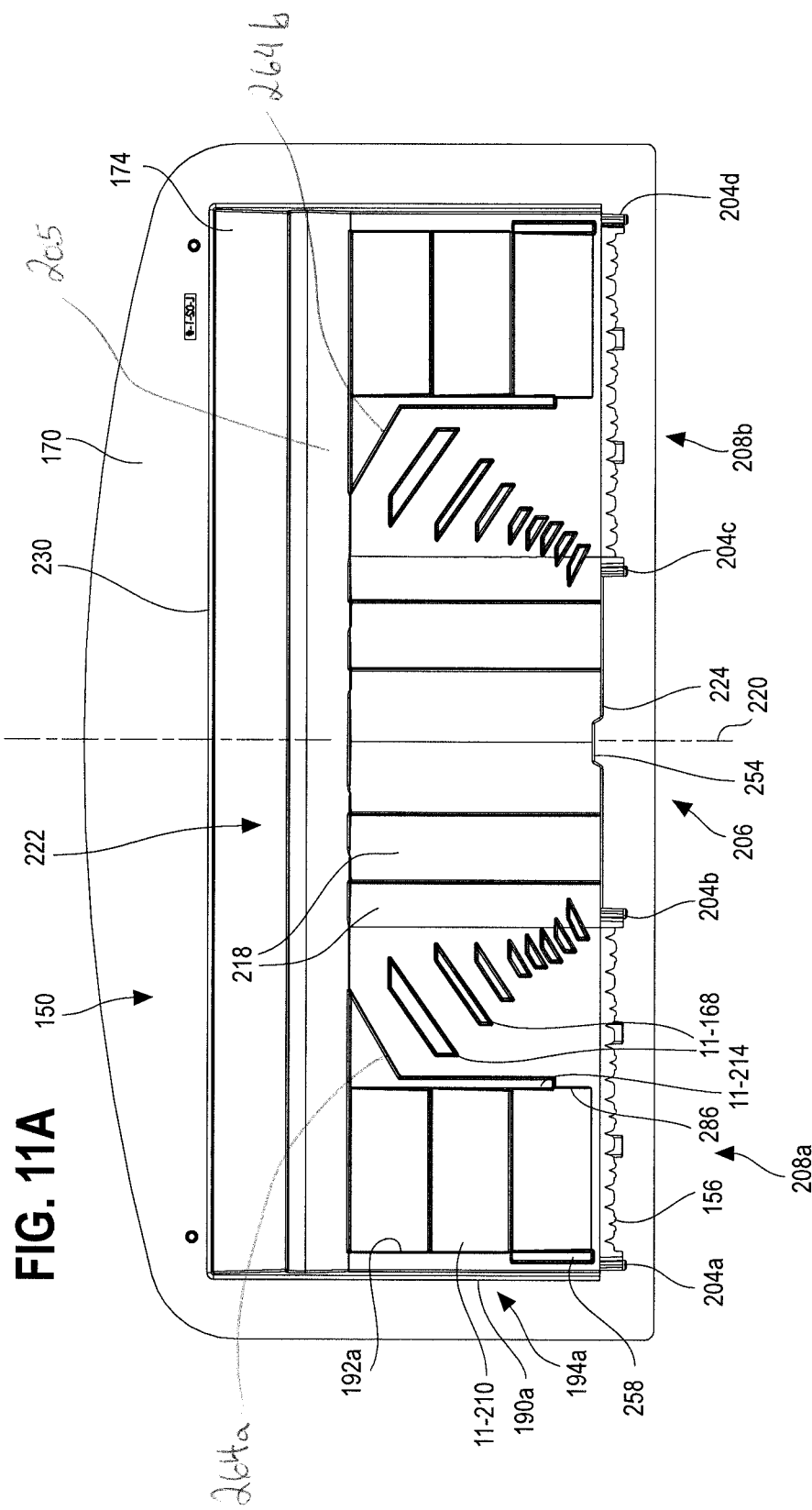
FIG. 11A is a plan view from above of the waveguide body of FIG. 10.

The bottom surface 152 of the waveguide body 126 of FIG. 10 is substantially identical to the bottom surface 152 shown in FIG. 4. Referring now to FIG. 11, the central section 206 of the waveguide body 126 is similar to the central section of the waveguide body of FIG. 6 except for the following differences. As with the previous embodiments, the central section 206 of the waveguide body 126 of FIG. 11 includes two side sections 208a, 208b that are preferably mirror images of one another. The planar surfaces 212a, 212b and central indentation 254 shown in the central section of FIG. 11 are similar to those in FIG. 6. Each side section 208a, 208b includes first and second pluralities of wedge-shaped light extraction members 11-210, 218 that are disposed transverse to one another. However, a planar surface 11-196a shown in FIG. 11 is relatively smaller than the planar surface 196a of FIG. 6. In this embodiment, inner side surface 11-192a is spaced apart from a facing wall 11-202a-2 to define a gap 258 therebetween.

The side section 208a of this embodiment includes the first plurality of wedge-shaped light extraction members 11-210 (shown in FIG. 11 as two members 11-210a-1 and 11-210a-2) extending between the side wall 194a and the planar rectangular portion 212a. A transition area 11-202a extends between the inner side surface 192a and the planar rectangular portion 212a. The transition area 11-202a may comprise a sloped surface 11-203. As shown in FIG. 11, each of the plurality of wedge-shaped light extraction members 11-210 includes sloping light extraction surfaces 11-210a-3 and 11-210a-4, respectively, similar or identical to a sloped surface 11-203 of the transition area 11-202a, that together direct light downwardly and out of the waveguide body 126. The plurality of wedge-shaped light extraction members 11-210 and the transition area 11-202a have more gradual sloped surfaces 11-210a-3, 11-210a-4, 11-203 as compared to the plurality of wedge-shaped light extraction members 210 in the embodiment of FIG. 6. In FIG. 11, as in FIG. 6, the extraction members 218 and transition area 201a extend between the planar surface 224 and the transition area 205 of the end portion 222.

Referring again to FIG. 11, inner end surfaces 11-210a-5, 11-210a-6 of the plurality of wedge-shaped light extraction members 11-210 and inner side surface 11-202a-1 are spaced apart from a facing side wall 212a-1 of the planar portion 212a to define a gap 11-214 therebetween. In this embodiment, the gap 11-214 is truncated by a protrusion 286 from the side wall 212a-1 such that nearest the coupling end surface 158 the gap ends approximately half way along the inner side surface 11-202a-1. The gap 11-214 is not tapered in the embodiment pictured in FIG. 11.

A plurality of light redirection cavities 11-168 extend into the planar portion 212a. In the illustrated embodiment, there are eight cavities 11-168a-1 through 11-168a-8. In this embodiment, all of the cavities 11-168a-1 through 11-168a-8 are substantially or fully trapezoidal in cross-sectional shape. Each cavity 11-168a-1 through 11-168a-8 has a base surface nearest the planar surface 224 that may be disposed at one or more angles relative to the planar surface 224 similar to the cavities 168a-7 through 168a-9 of FIG. 6. Likewise, each cavity 11-168a-1 through 11-168a-8 comprises a prismatic shape similar to the cavities 168a-7 through 168a-9 of FIG. 6.

A plurality of wedge-shaped light extraction members 218a-1, 218a-2, and a sloped transition area 201a are disposed between the planar portion 212a and the center line 220, and extend between the coupling end surface 158 and the transition area 205 of the end portion 222. The transition area 201a and the extraction features 218 direct light redirected by the cavities 168 out of the bottom surface 152 of the waveguide body 126. Light is also directed outwardly through the surface 152 by the transition feature 205 and the wedge-shaped extraction member 170. As in the previous embodiment, the transition feature 205 may comprise a curved shape, such as a "J" shape, as it meets the wedge-shaped extraction member 170. FIG. 12 shows an example cross-sectional geometry of the extraction members 218 and the bottom surface extraction features 162 as indicated in FIG. 11. As previously discussed, the geometry of the extraction members 218 and extraction features 162 may be altered to manipulate the illumination pattern produced by the waveguide body 126.

Figure 16:
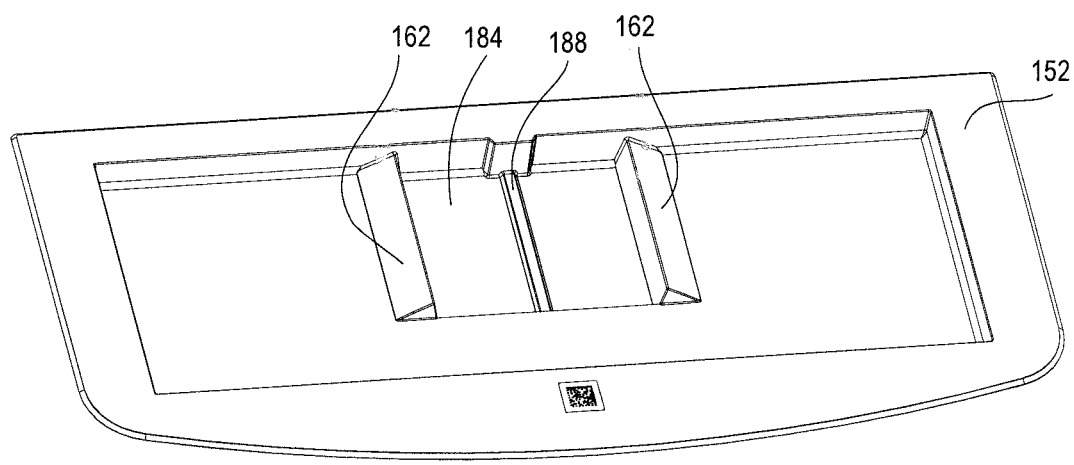
FIG. 16 is an isometric view from below of a waveguide body for use in the luminaire of FIG. 1.
Figure 17:
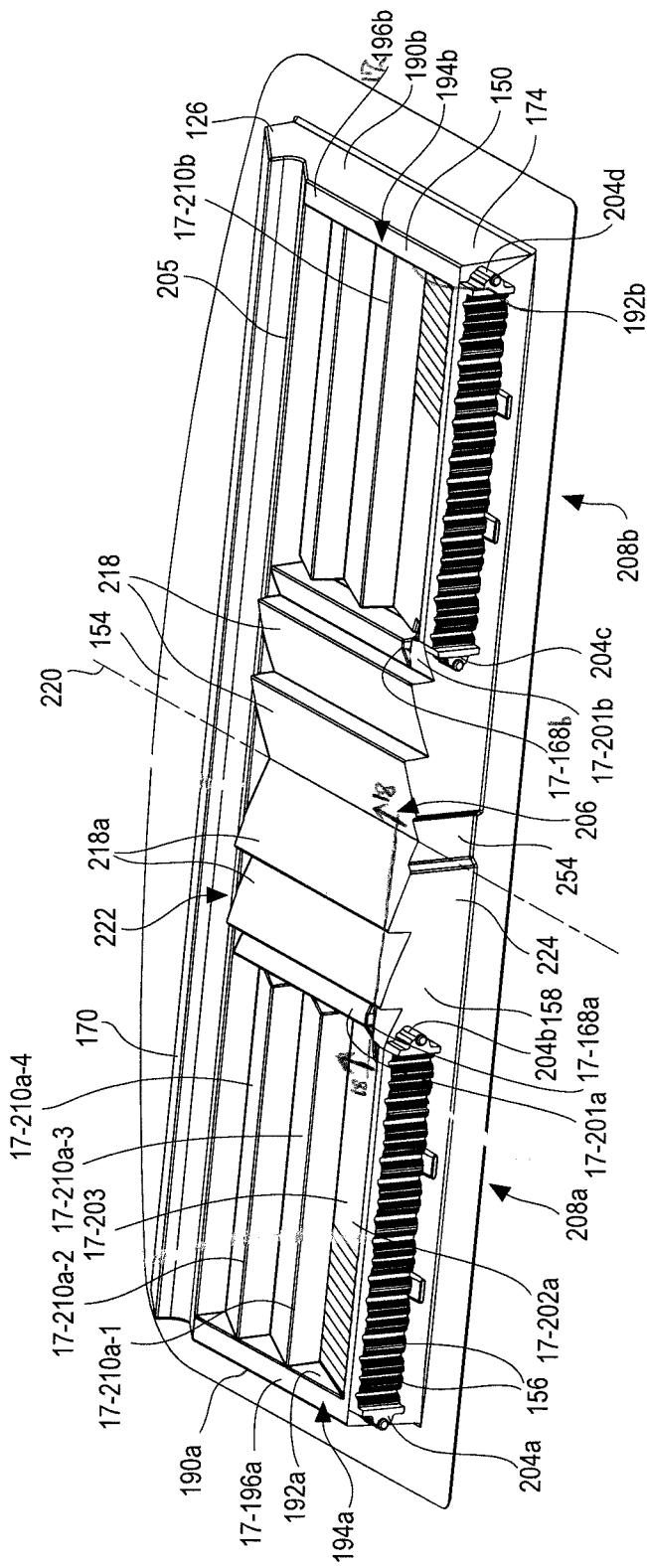
FIG. 17 is an isometric view from above of the waveguide body of FIG. 16.

1001011 The bottom surface 152 of the waveguide body 126 of FIG. 16 is substantially identical to the bottom surface 152 shown in FIGS. 4 and 10. Referring now to FIG. 17, the central section 206 of the waveguide body 126 is similar to the central section of the waveguide body of FIG. 6 except for the following differences. As with the previous embodiments, the central section 206 of the waveguide body 126 of FIG. 17 includes two side sections 208a, 208b that are preferably mirror images of one another. Planar surface 17-196a in FIG. 17 is relatively smaller than the planar surface 196a of FIG. 6. Planar surfaces 212a, 212b from FIG. 6 are omitted in FIG. 17, but the central indentation 254 on the planar surface 224 remains. Each side section 208a, 208b includes a first plurality of light extraction members 17-210 disposed transverse to the plurality of light extraction members 218.

The side section 208a of this embodiment includes the first plurality of wedge-shaped light extraction members 17-210 (shown in FIG. 17 as two members 17-210a-1 and 17-210a-2) extending between the side wall 194a and transition area 17-201a. A transition area 17-202a extends between the inner side surface 192a and the transition area 17-201 a. The transition area 17-202a may comprise a sloped surface 17-203. As shown in FIG. 17, each of the plurality of wedge-shaped light extraction members 17-210 includes sloping light extraction surfaces 17-210a-3 and 17-210a-4, respectively, similar or identical to a sloped surface 17-203 of the transition area 17-202a, that together direct light downwardly and out of the waveguide body 126. The plurality of wedge-shaped light extraction members 17-210 and the transition area 17-202a have more steeply sloped surfaces 17-210a-3, 17-210a-4, 17-203 as compared to the plurality of light extraction members 210 in the embodiment of FIG. 11. In FIG. 17, as in FIGS. 6 and 11, the extraction members 218 and transition area 17-201 a extend between the planar surface 224 and the transition area 205 of the end portion 222.

Figure 18:
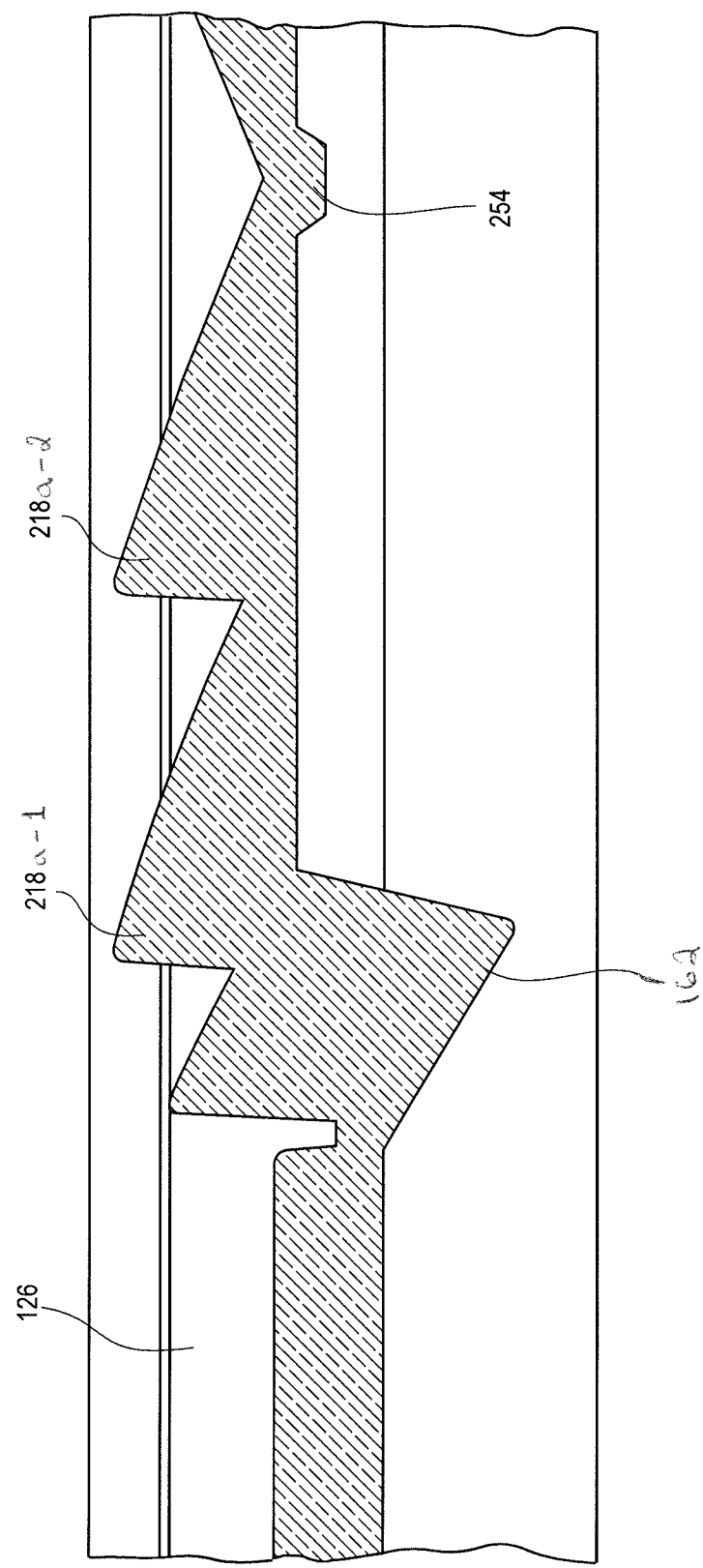
FIG. 18 is a fragmentary enlarged cross-sectional view taken generally along the lines 18-18 indicated in FIG. 17.

In this embodiment, a single light redirection cavity 17-168 extends into the transition areas 17-201 a and 17-202a. In the illustrated embodiment, there is one cavity 17-168a, 17-168b on each side section 208a, 208b. Further in this embodiment, the cavity 17-168a is substantially or fully trapezoidal in cross-sectional shape. The cavity 17-168a has a base surface nearest the planar surface 224 that is disposed at an angle relative to the planar surface 224 similar to the cavities 168a-7 through 168a-9 of FIG. 6. Likewise, the cavity 17-168a comprises a prismatic shape similar to the cavities 168a-7 through 168a-9 of FIG. 6. FIG. 18 shows an example cross-sectional geometry of the extraction members 218 and the bottom surface extraction features 162 as indicated in FIG. 17. Just as in previous embodiments, the geometry of the extraction members 218 and extraction features 162 may be altered to manipulate the illumination pattern.

Figure 19:
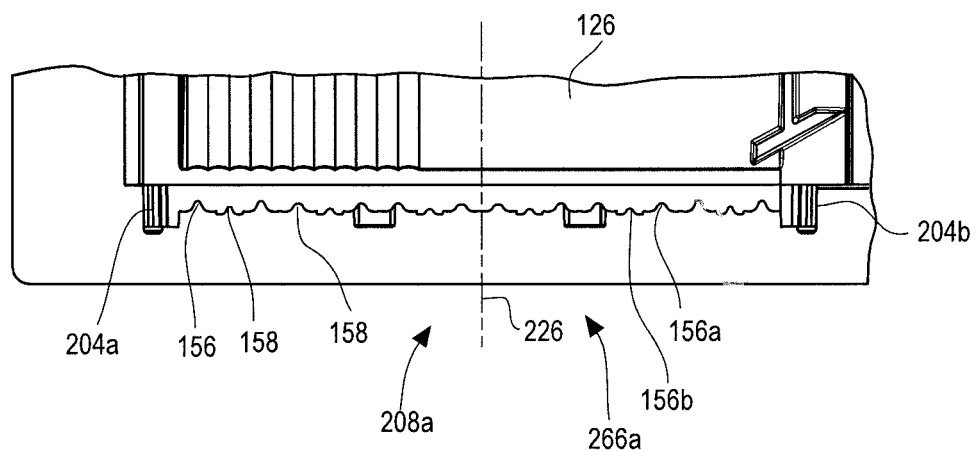
FIG. 19 is a partial plan view of the waveguide body of FIG. 17.

Referring now to FIGS. 17 and 19, the transition surface 17-203 is smooth on a portion nearest the transition area 17-201 a and scalloped or faceted on a portion nearest the inner side surface 192a. The relative proportions of scalloped-to-smooth surfaces on the transition surface 17-203 may be altered, but the embodiment depicted in FIG. 17 shows relatively more smooth surface than scalloped surface.

Referring still to FIG. 19, the coupling cavities 156 of the side section 208a of the waveguide body 126 are shown in detail. As discussed above with reference to FIG. 5, the sizes and/or shapes of the coupling cavities 156 may differ or may all be the same. Thus, in the embodiment illustrated in FIG. 19, each of the coupling cavities 156a has a depth that extends farther into the waveguide body 126 than nearby coupling cavities 156b. However, the depth each coupling cavity 156 extends into the waveguide body 126 is deepest near the first and second protrusions 204a, 204b. The depth each coupling cavity 156 extends into the waveguide body 126 is shallowest near a center line 226 of the coupling cavity subset 266a on the side section 208a. As with center line 220, the center line 226 of each side section 208a, 208b may be substantially centered or may instead be a particular line offset to either side by a selected amount, such particular line dividing each section 208a, 208b of the waveguide body.

Each light coupling cavity 156 is defined by a surface 164 that is substantially or generally parabolic or bell-curve shaped in cross section (as seen in a cross section taken transverse to the coupling end surface 158 and parallel to the bottom surface 152), as discussed above. In addition, the coupling cavity surface 164 increases in width and decreases in depth the nearer each coupling cavity 156 is to the center line 226. Thus, the focal point of each parabolic coupling cavity surface 164 is disposed nearer the coupling end surface 158 the nearer the particular coupling cavity 156 is to the center line 226 of side 208a. The focal length of each parabolic coupling cavity 156 may become longer or shorter according to the above described relation to the center line 226. Alternatively, the focal length may change with dependence on the center line 220. Other patterns may also determine the relative change in focal length of each parabolic coupling cavity 156. The change in shape may be the same or different for the BSY coupling cavities 156a and the red coupling cavities 156b.

Figure 24:
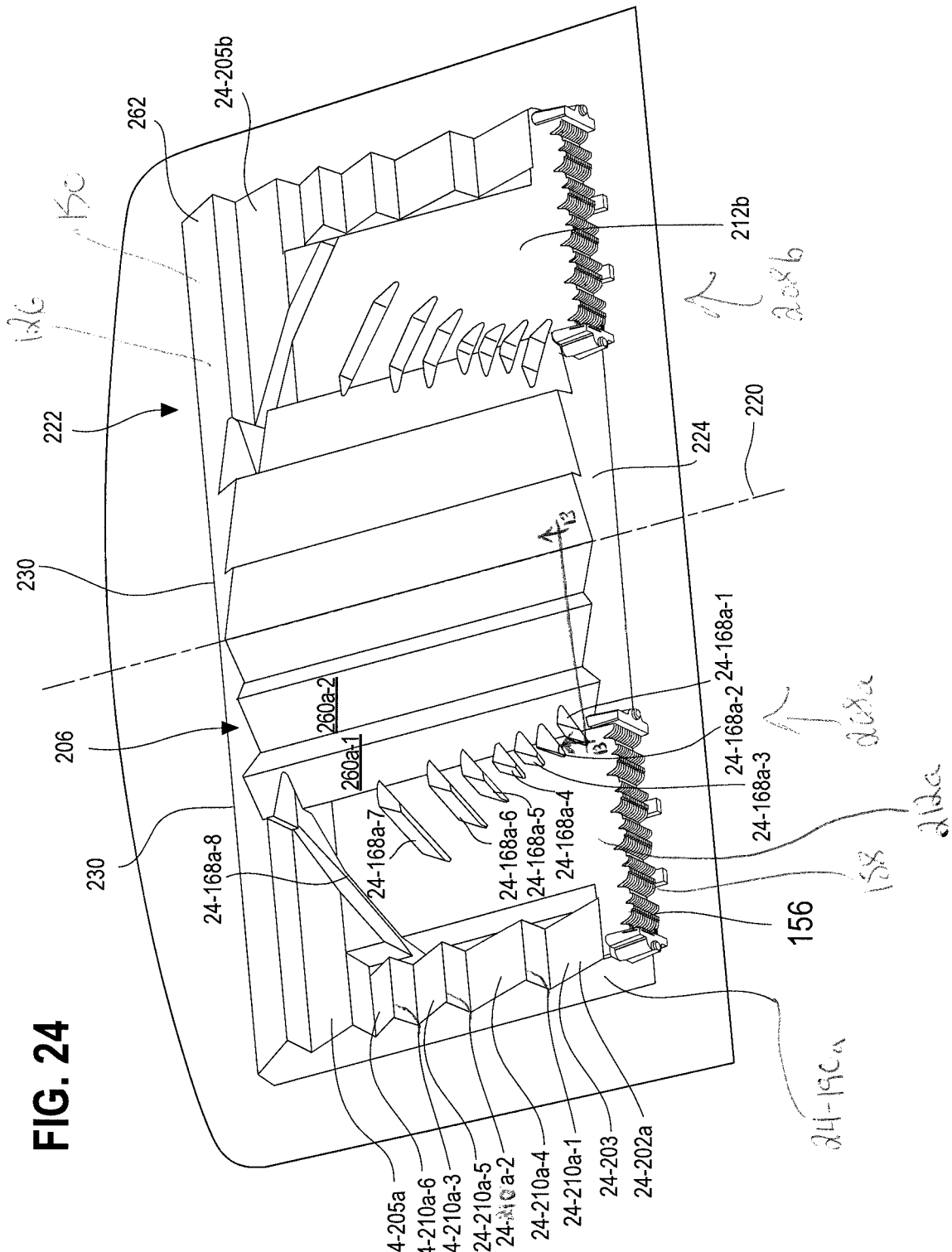
FIG. 24 is an isometric view from above of a waveguide body for use in the luminaire of FIG. 21.

FIGS. 21-23 depict the medium sized luminaire 100a as discussed above. The waveguide bodies shown in and described with respect to FIGS. 13-15 and 24-33 may be suitable for use with the medium sized luminaire 100a. Referring now to FIG. 24, the top surface 150 of the waveguide body 126 is shown. The central section 206 of the waveguide body 126 is similar to the central section of the waveguide body of FIG. 6 except for the following differences. As with the previous embodiments, the central section 206 of the waveguide body 126 of FIG. 24 includes two side sections 208a, 208b that are preferably mirror images of one another.

The planar surfaces 212a, 212b shown in the central section of FIG. 24 are larger relative to the first plurality of wedge-shaped light extraction members 24-210. Also, the central indentation 254 previously shown in the central section 206 of FIG. 6, is omitted. Each side section 208a, 208b includes first and second pluralities of wedge-shaped light extraction members 24-210, 260 that are disposed transverse to one another. However, planar surface 196a shown in FIG. 6 is omitted in the embodiment of FIG. 24. In this embodiment, side surface 24-190a forms side surfaces of light extraction members 24-210 and transition area 24-202a.

The wedge-shaped light extraction members of the first plurality 24-210 (shown in FIG. 24 as three members 24-210a-1, 24-210a-2, and 24-210a-3) and the transition area 24-202a extend between the side surface 24-190a and the planar rectangular portion 212a. The transition area 24-202a extends between the side surface 24-190a and the planar rectangular portion 212a. The transition area 24-202a may comprise a sloped surface 24-203. As shown in FIG. 24, each of the plurality of wedge-shaped light extraction members 24-210 includes sloping light extraction surfaces 24-210a-4, 24-210a-5, and 24-210a-6, respectively, similar or identical to the sloped surface 24-203 of the transition area 24-202a, that together direct light downwardly and out of the waveguide body 126.

The plurality of wedge-shaped light extraction members 24-210 and the transition area 24-202a have sloped surfaces 24-210a-4, 24-210a-5, 24-210a-6, 24-203 that vary in steepness of slope. Sloped surfaces 24-210a-4 and 24-203 have the most gradual slope (and perhaps identical slope), while sloped surface 24-210a-5 is more steeply sloped, and sloped surface 24-210a-6 is the most steeply sloped surface of the embodiment of FIG. 24. The transition surface 24-203 of FIG. 24 is smooth.

A plurality of light redirection cavities 24-168 extend into the planar portion 212a. In the embodiment of FIG. 24, there are eight cavities 24-168a-1 through 24-168a-8. In this embodiment, all of the cavities 24-168a-1 through 24-168a-8 are substantially or fully trapezoidal in cross-sectional shape. The cavities 24-168a-1 through 24-168a-8 each have base surfaces nearest the planar surface 224 that are disposed at one or more angles relative to the planar surface 224 similar to the cavities 168a-7 through 168a-9 of FIG. 6. Likewise, each cavity 24-168a-1 through 24-168a-8 comprises a prismatic shape similar to the cavities 168a-7 through 168a-9 of FIG. 6. The light redirection cavities 24-168 are arranged partially spanning the planar surface 212a and the transition area 24-201a. Redirection cavity 24-168a-8 partially spans the planar surface 212a, the transition area 24-201a and the transition area 24-205.

A plurality of wedge-shaped light extraction members 260a-1, 260a-2, and a sloped transition area 24-201a are disposed between the planar portion 212a and the center line 220, and extend between the coupling end surface 158 and the non-coupling end surface 230. The transition area 24-201a and the extraction features 260 direct light redirected by the cavities 168 out of the bottom surface 152 of the waveguide body 126. Light is also directed outwardly through the surface 152 by the transition feature 24-205a and a wedge-shaped extraction member 262. The geometry of the extraction members 260 and extraction features 162 may be altered to manipulate the illumination pattern produced by the waveguide body 126. Additionally, the extraction members 260 may have the same or similar shapes as the other light extraction features 262, 24-210, but may differ in size.

Figure 13:
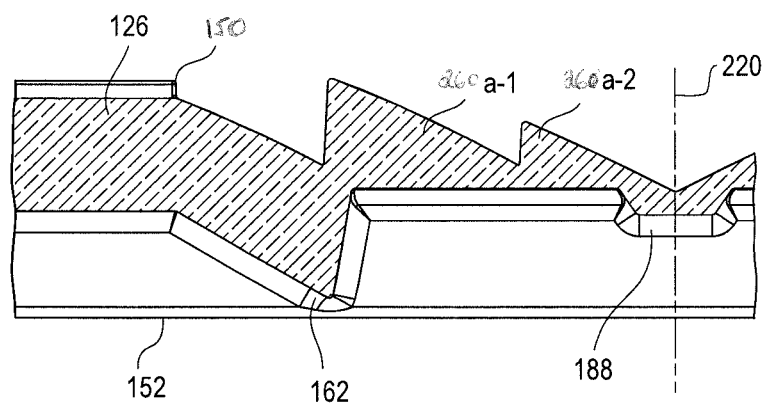
FIG. 13 is a fragmentary enlarged cross-sectional view taken generally along the lines 13-13 indicated in FIG. 24.

FIG. 13 shows an example cross-sectional geometry of the extraction members 260 and the bottom surface extraction features 162 as indicated in FIG. 24. As previously discussed, the geometry of the extraction members 260 and extraction features 162 may be altered to manipulate the illumination pattern produced by the waveguide body 126. In the embodiment of FIG. 24, the wedge-shaped extraction features 262, 24-210, and 260 and the light redirection cavities 24-168 are arranged to develop an illumination pattern for relatively wider street coverage when the optical assembly 118 is used in a streetlight application.

A transition area 24-205a is arranged between the wedge-shape light extraction member 262 of the non-coupling end portion 222 and both the wedge-shaped light extraction member 24-210a-3 and planar portion 212a. The transition area 24-205a does not extend the full width of the outboard portion 174 on the non-coupling end portion 222. In this embodiment, the wedge-shaped light extraction members 260 run the full length of the outboard portion 174 from the coupling end surface 158 to the non-coupling end surface 230. End portions of the wedge-shaped light extraction members 260 form a part of the wedge-shaped light extraction member 262 on the non-coupling end portion 222.

Figure 25:
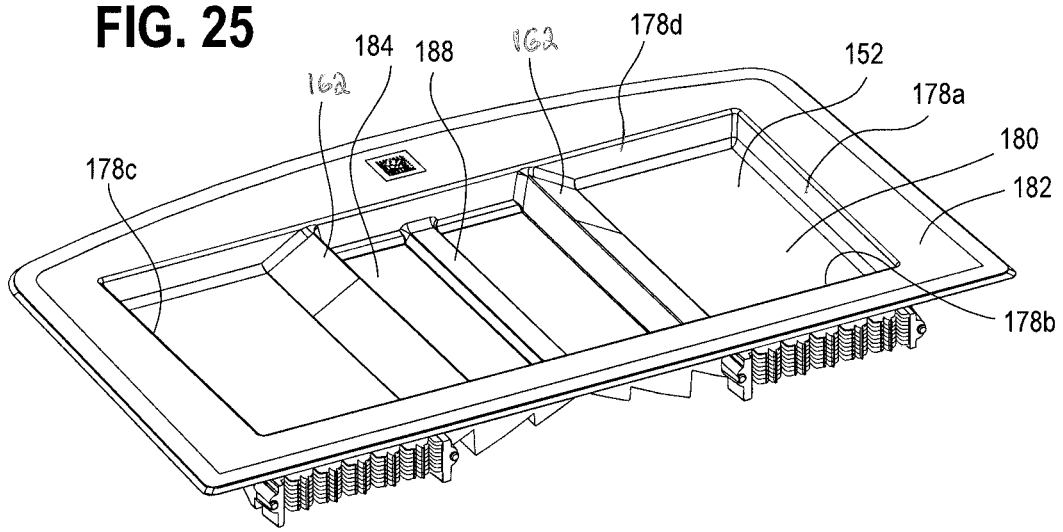
FIG. 25 is an isometric view from below of the waveguide body of FIG. 24.

Referring now to FIG. 25, the bottom surface 152 is substantially identical to the bottom surface 152 shown in FIG. 4. As discussed with respect to previous embodiments, the outer planar surface 182 extends outwardly from and transverse to the side surfaces 178a-178d. Outer planar surface 182 may be formed from transparent or other material capable of internal reflection. Light may escape into the outer planar surface 182 from the waveguide body 182. It further may be desirable for all light to be extracted from the luminaire 100a, and thus, outer planar surface 182 (shaded in the embodiment depicted in FIG. 25) may be textured on the emission surface such that any light internally reflected within the outer planar surface 182 is extracted in the same general direction as light extracted from the inner recessed section 184 of the waveguide body 126.

Figure 27:
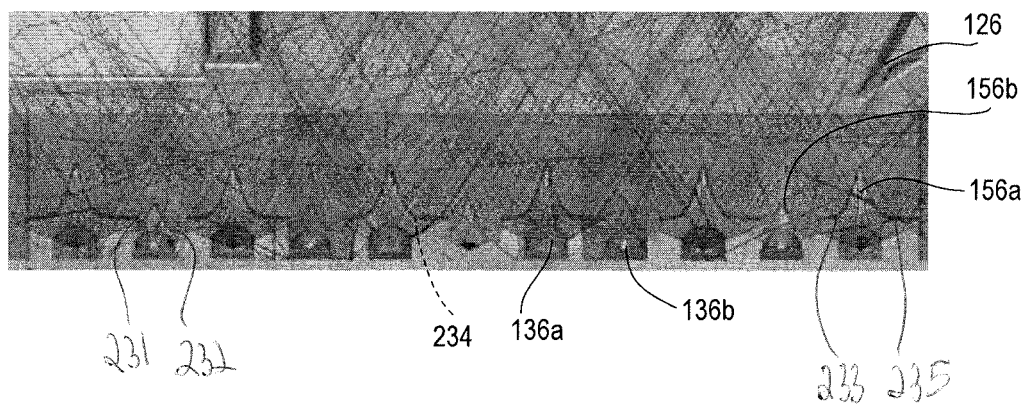
FIG. 27 is a partial plan view of the waveguide body of FIG. 24.

Referring now to FIG. 26, the coupling cavities 156 are shown in greater detail. High angle heavily textured light shield portions 232 of coupling cavity surfaces 164 of the red coupling cavities 156b are shaded in FIG. 26. These diffusing portions 232 are arranged between each respective red LED element 136b and the body of the waveguide 126. The shield portions 232 prevent red strips. To further enhance color mixing, light mixing bumps 234 are disposed on the coupling cavity surfaces 164. FIG. 27 shows light rays entering the waveguide body 126 from BSY and red LED elements 136a, 136b. The dispersion of the light rays once coupled into the waveguide body illustrates the diffusion and color mixing effects of the shield portions 232 and light mixing bumps 234. Other portions of the coupling cavity surfaces 164 may be textured instead, or in addition to, the light shield portions 232 to manipulate the diffusion and color mixing properties of the coupling cavities 156. FIGS. 26 and 27 further show an embodiment with asymmetric coupling cavity surface geometry for increasing controlled light coupled into the waveguide body 126. In this embodiment, the light shield portion 232 extends further from the waveguide body 126 than facing portion 231. The coupling cavity geometry may be symmetric or asymmetric for both the BSY and red LED elements 136a, 136b. The symmetry or asymmetry of the coupling cavities 156 may repeat or be random. Further depicted in FIGS. 26 and 27, surfaces 233 and 235 are also asymmetric such that surface 235 of BSY coupling cavity 156a is relatively longer or larger as compared with facing surface 233 of the same cavity.

Referring now to FIG. 28, the top surface 150 of the waveguide body 126 is shown. The central section 206 of the waveguide body 126 is similar to the central section of the waveguide body of FIG. 24 except for the following differences. As with the previous embodiments, the central section 206 of the waveguide body 126 of FIG. 28 includes two side sections 208a, 208b that are preferably mirror images of one another.

Each side section 208a, 208b includes first and second pluralities of wedge-shaped light extraction members 28-210, 260 that are disposed transverse to one another. The planar surfaces 212a, 212b shown in the central section of FIG. 28 are larger relative to the first plurality of wedge-shaped light extraction members 28-210. However, planar surface 196a shown in FIG. 6 is omitted in the embodiment of FIG. 28, as is indentation 254. In this embodiment, side surface 28-190a forms side surfaces of light extraction members 28-210 and transition area 28-202a.

The wedge-shaped light extraction members of the first plurality 28-210 (shown in FIG. 28 as three members 28-210a-1, 28-210a-2, and 28-210a-3) and the transition area 28-202a extend between the side surface 28-190a and the planar rectangular portion 212a. The transition area 28-202a may comprise a sloped surface 28-203. As shown in FIG. 28, each of the plurality of wedge-shaped light extraction members 28-210 includes sloping light extraction surfaces 28-210a-4, 28-210a-5, and 28-210a-6, respectively, similar or identical to the sloped surface 28-203 of the transition area 28-202a, that together direct light downwardly and out of the waveguide body 126.

The sloped surfaces 28-210a-4, 28-210a-5, 28-210a-6, 28-203 vary in degree of slope in this embodiment. Sloped surfaces 28-210a-4, 28-210a-5, and 28-203 have moderate slope, while sloped surface 28-210a-6 is relatively more gradually sloped. The transition surface 28-203 of FIG. 28 is smooth.

A plurality of light redirection cavities 28-168 extend into the planar portion 212a. In the embodiment of FIG. 28, there are eight cavities 28-168a-1 through 28-168a-8. In this embodiment, all of the cavities 28-168a-1 through 28-168a-8 are substantially or fully trapezoidal in cross-sectional shape. The cavities 28-168a-1 through 28-168a-8 each have base surfaces nearest the planar surface 224 that are disposed at one or more angles relative to the planar surface 224 similar to the cavities 168a-7 through 168a-9 of FIG. 6. Likewise, each cavity 28-168a-1 through 28-168a-8 comprises a prismatic shape similar to the cavities 168a-7 through 168a-9 of FIG. 6. The light redirection cavities 28-168a-1 through 28-168a-6 are arranged partially spanning the planar surface 212a and the transition area 28-201a. Redirection cavity 28-168a-7 is arranged only in the planar surface 212a, while redirection cavity 28-168a-8 partially spans the planar surface 212a, the transition area 28-201a, and the transition area 28-205a.

A plurality of wedge-shaped light extraction members 260a-1, 260a-2, and a sloped transition area 28-201a are disposed between the planar portion 212a and the center line 220, and extend between the coupling end surface 158 and the non-coupling end surface 230. The transition area 28-201a and the extraction members 260 direct light redirected by the cavities 28-168 out of the bottom surface 152 of the waveguide body 126. Light is also directed outwardly through the surface 152 by the transition feature 28-205a and a wedge-shaped extraction member 262 disposed at the non-coupling end 222.

Figure 15:
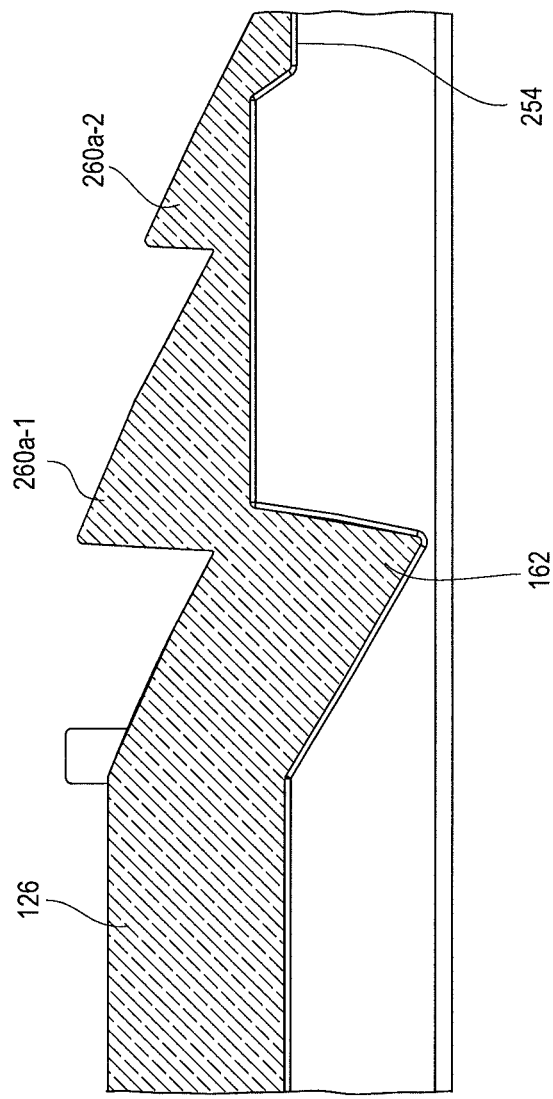
FIG. 15 is a fragmentary enlarged cross-sectional view taken generally along the lines 15-15 indicated in FIG. 28.

FIG. 15 shows an example cross-sectional geometry of the extraction members 260 and the bottom surface extraction features 162 as indicated in FIG. 28. As previously discussed, the geometry of the extraction members 260 and extraction features 162 may be altered to manipulate the illumination pattern produced by the waveguide body 126. In the embodiment of FIG. 28, the wedge-shaped extraction features 262, 28-210, and 260 and the light redirection cavities 28-168 are arranged to develop an illumination pattern for wider street coverage when the optical assembly 118 is used in a streetlight application.

A transition area 28-205a is arranged between the wedge-shape light extraction member 262 of the non-coupling end portion 222 and both the wedge-shaped light extraction member 28-210a-3 and planar portion 212a. The transition area 28-205a does not extend the full width of the outboard portion 174 on the non-coupling end portion 222. In this embodiment, the wedge-shaped light extraction members 260 run the full length of the outboard portion 174 from the coupling end surface 158 to the non-coupling end surface 230. End portions of the wedge-shaped light extraction members 260 form a part of the wedge-shaped light extraction member 262 on the non-coupling end portion 222.

Figure 29:
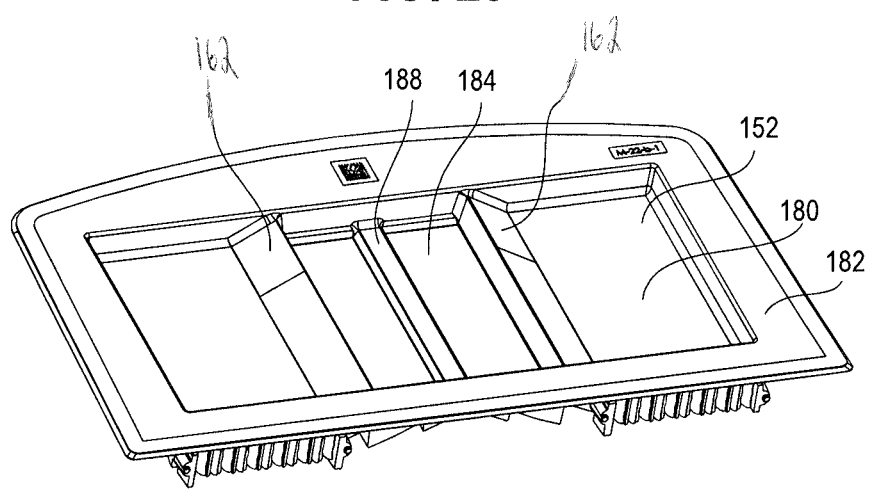
FIG. 29 is an isometric view from below of the waveguide body of FIG. 28.

Referring now to FIG. 29, the bottom surface 152 is substantially identical to the bottom surface 152 shown in FIG. 4. Furthermore, similar to the waveguide body of FIG. 25, outer planar surface 182 may be textured on the emission surface such that any light internally reflected within the outer planar surface 182 is extracted. However, in the embodiment of FIG. 29, the inner recessed section 184 and the rib 188 are also textured. Texture on the emission surfaces of both the outer planar surface 182 and the inner recessed section 184 and rib 188 may aid in extracting any stray diffused light as well as providing additional color mixing.

Figure 30:
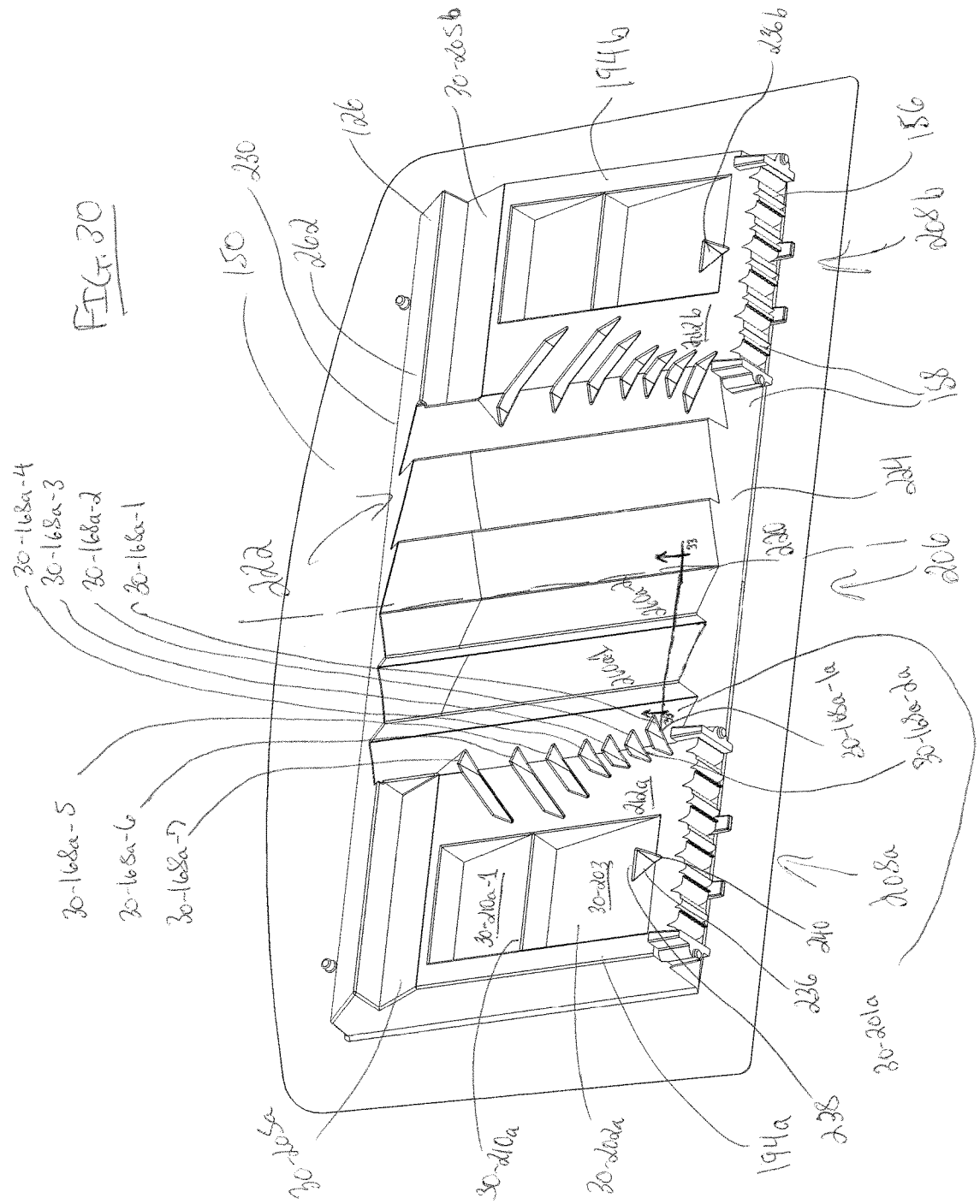
FIG. 30 is an isometric view from above of a waveguide body for use in the luminaire of FIG. 21.

Referring now to FIG. 30, the top surface 150 of the waveguide body 126 is shown. The central section 206 of the waveguide body 126 is similar to the central section of the waveguide body of FIG. 28 except for the following differences. As with the previous embodiments, the central section 206 of the waveguide body 126 of FIG. 30 includes two side sections 208a, 208b that are preferably mirror images of one another. The side section 208a includes a first wedge-shaped light extraction member 30-210a extending between the side wall 194a and a planar rectangular portion 212a. A transition area 30-202a also extends between the side wall 194a and the planar rectangular portion 212a. The transition area 30-202a may comprise a sloped surface 30-203 that may be polished, and/or may include faceting or scalloping on all or a portion of the sloped surface 30-203, as seen in FIG. 20 in connection with that previously discussed embodiment.

As shown in FIG. 30, each of the wedge-shaped light extraction members 30-210a includes sloping light extraction surface 30-210a-1, which is similar or identical to the sloped surface 30-203 of the transition area 30-202a, that together direct light downwardly and out of the waveguide body 126. In this embodiment, the transition area 30-202a and the single wedge-shaped light extraction member 30-210a are larger as compared to the wedge-shaped light extraction members 24-210 and 28-210 of FIGS. 24 and 28, respectively. Further, the sloped surface 30-203 of the transition area 30-202a and the sloping light extraction surface 30-210a-1 of single wedge-shaped light extraction member 30-210a have more gradual slopes as compared to the wedge-shaped light extraction members of other embodiments or the transition area 30-205a and wedge-shaped light extraction member 262 of the end portion 222. The gradual incline of the wedge-shaped light extraction member 30-210a and the transition area 30-202a are arranged to develop an illumination pattern that provides wider street coverage, as compared to the waveguide body of FIG. 28.

A plurality of light redirection cavities 30-168 extend into the planar portion 212a. In the illustrated embodiment, there are seven cavities 30-168a-1 through 30-168a-7. The cavities 30-168a-1 through 30-168a-7 are substantially or fully trapezoidal in cross-sectional shape as seen in FIG. 30. The cavities 30-168 have base surfaces (30-168a-1a, 30-168a-2a, etc.) nearest the planar surface 224 that are disposed at one or more angles relative to the planar surface 224, similar to FIG. 6. Remaining side surfaces defining each cavity 30-168 form a prismatic shape with the base surface associated therewith.

Figure 33:
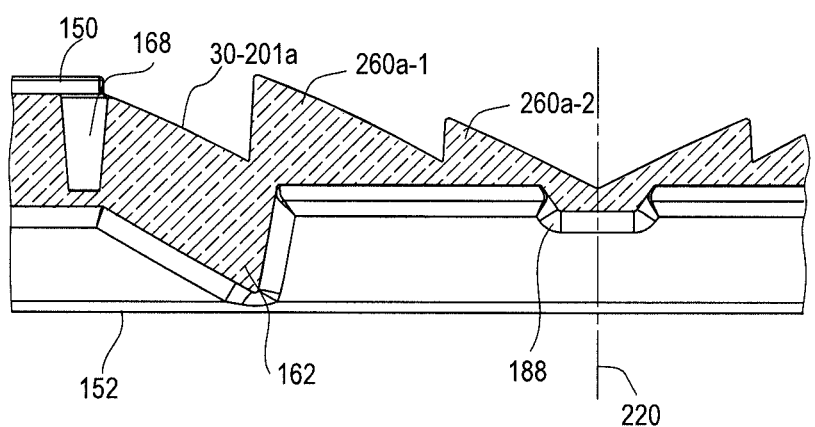
FIG. 33 is a fragmentary enlarged cross-sectional view taken generally along the lines 33-33 indicated in FIG. 30.

A plurality of wedge-shaped light extraction members 260a-1, 260a-2, and a sloped transition area 30-201a are disposed between the planar portion 212a and the center line 220, and extend between the coupling end surface 158 and the non-coupling end surface 230. FIG. 33 shows an example cross-sectional geometry of the extraction members 30-260 and the bottom surface extraction features 162 as indicated in FIG. 30. The transition area 30-201a and the extraction features 30-260 direct light redirected by the cavities 30-168 out of the bottom surface 152 of the waveguide body 126. Light is also directed outwardly through the surface 152 by the transition feature 30-205 and the wedge-shaped extraction member 262.

Figure 32:
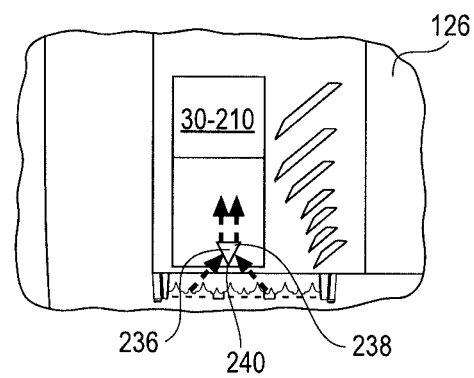
FIG. 32 is a partial plan view of the waveguide body of FIG. 30.

Referring still to FIG. 30, the transition surface 30-203 is smooth in the depicted embodiment. Further, the transition area 30-202a includes a triangular light redirecting cavity 236. The triangular light redirecting cavity 236a is formed by a vertical triangle cut into the transition area 30-202a. The triangular light redirecting cavity 236a is configured as a refracting optic that assists in developing an illumination pattern for covering a relatively wider street. Referring ahead to FIG. 32, the arrows therein show the general refractive property of the triangular redirecting cavity 236a. Thus, additional light is directed along the y-dimension of the waveguide body 126 and a narrower illumination pattern is effectuated. The triangular light redirection cavity 236a has an equilateral triangular shape and is disposed such that a side surface 238 is parallel to the planar end surface 224 and a point 240 opposite the side surface 238 is disposed between the coupling cavities 156 and the transition area 30-202a. The coupling geometry of FIG. 30 is similar to that shown in FIG. 27 and provides improved color mixing as well as aids in developing an illumination pattern that adequately illuminates a location relatively far from the location of the optical assembly 118 when utilized in a streetlight application. In this embodiment, the light redirection cavities 168 are arranged, in conjunction with the wedge-shaped light extraction members 210, to develop an illumination pattern that provides wider street coverage when compared to the embodiment of FIG. 28.

Figure 31:
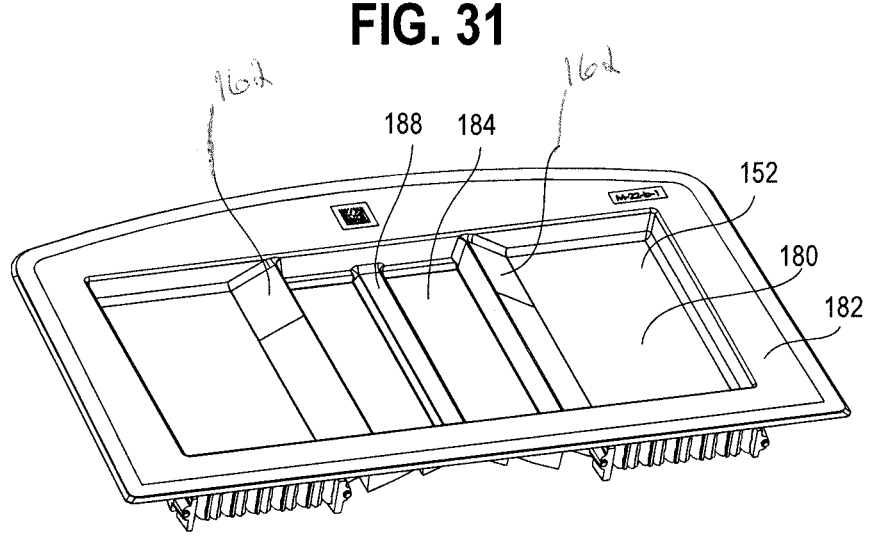
FIG. 31 is an isometric view from below of the waveguide body of FIG. 30.

Referring now to FIG. 31, the bottom surface 152 is substantially identical to the bottom surface 152 shown in FIG. 4 and has texturing on surfaces similar to the embodiment of FIG. 25. It may be desirable for all light to be extracted from the luminaire 100a, and thus, outer planar surface 182 (shaded in the embodiment depicted by FIG. 31) may be textured on the emission surface 152 such that any light internally reflected within the outer planar surface 182 is extracted. Further, the texture may assist in diffusion of any stray light internally reflected within the outer planar surface 182.

In some embodiments, the waveguide body includes a plurality of redirection features and a plurality of extraction features, wherein the redirection features are relatively smaller than the extraction features. In other embodiments, at least one redirection feature has a linear extent in a first direction and at least one extraction feature has a linear extent in a second direction different from the first direction. In further embodiments, the linear extent of at least one extraction feature extends the entire length or width of the waveguide, and the linear extent of the at least one redirection feature is smaller than the linear extent of the extraction feature.

In still further embodiments, extraction features are disposed on a bottom surface of the waveguide and redirection features extend into an upper surface of the waveguide opposite the bottom surface. In other embodiments, the redirection features are disposed at an angle relative to an extent (in the x-dimension) of a plurality of coupling cavities and the extraction features are disposed perpendicular and/or parallel to the extent (in the x-dimension) of the plurality of coupling cavities. Further still, the waveguide dimensions are exemplary only, it being understood that one or more dimensions could be varied. For example, the dimensions can all be scaled together or separately to arrive at a larger or smaller waveguide body, if desired. While a uniform distribution of light may be desired in certain embodiments, other distributions of light may be contemplated and obtained using different arrays of extraction features.

Other embodiments of the disclosure including all of the possible different and various combinations of the individual features of each of the foregoing embodiments and examples are specifically included herein. Any one of the light redirection features could be used in an embodiment, possibly in combination with any one of the light extraction features of any embodiment. Similarly, any one of the light extraction features could be used in an embodiment, possibly in combination with any one of the light redirection features of any embodiment. Thus, for example, a luminaire incorporating a waveguide of one of the disclosed shapes may include extraction features of the same or a different shape, and the extraction features may be symmetric or asymmetric, the luminaire may have combinations of features from each of the disclosed embodiments, etc. without departing from the scope of the invention.

The spacing, number, size, and geometry of extraction features 162 determine the mixing and distribution of light in the waveguide body 126 and light exiting therefrom. In the illustrated embodiment, the extraction features 162 comprise a series of ridges separated by intervening troughs at least some of which define one or more inverted V-shapes in cross section, as seen in the FIGS. Also, at least one (and perhaps more or all) of the bottom surface extraction features 162, top surface extraction members or any, or all of the other extraction features disclosed herein may be continuous (i.e., it extends in a continuous manner), while any remaining extraction features may comprise continuous or discontinuous ridges (i.e., partial linear and/or nonlinear features extending continuously or discontinuously) separated by intervening troughs.

If desired, inflections or other surface features may be provided in any of the extraction features disclosed herein. Still further, for example, as seen in the illustrated embodiment, all of the extraction features 162 are symmetric with respect to the center line 220 of the waveguide body 126, although this need not be the case. Further, one or more of the extraction features 162 may have a texturing on the top surface 150 of the waveguide body 126, or the extraction features may be smooth and polished. In any of the embodiments described herein, the top surface 150 of the waveguide body 126 may be textured in whole or in part, or the top surface 150 may be smooth or polished in whole or in part.

In addition to the foregoing, the waveguide body 126 and any other waveguide body disclosed herein may be tapered in an overall sense from the coupling cavities 156 to the end surface in that there is less material at the general location of the non-coupling end surface 230 than at portions adjacent the coupling cavities 156. Such tapering may be effectuated by providing extraction features that become deeper and/or more widely separated with distance from the coupling cavities 156. The tapering maximizes the possibility that substantially all the light introduced into the waveguide body 126 is extracted over a single pass of the light therethrough. This results in substantially all of the light striking the outward surfaces of the extraction features 168, which surfaces are carefully controlled so that the extraction of light is also carefully controlled. The combination of tapering with the arrangement of extraction features result in improved color mixing with minimum waveguide thickness and excellent control over the emitted light.

The driver circuit 110 may be adjustable either during assembly of the luminaire 100, 100a or thereafter to limit/adjust electrical operating parameter(s) thereof, as necessary or desirable. For example, a programmable element of the driver circuit 110 may be programmed before or during assembly of the luminaire 100, 100a or thereafter to determine the operational power output of the driver circuit 110 to one or more strings of LED elements 136. A different adjustment methodology/apparatus may be used to modify the operation of the luminaire 100, 100a as desired.

1001391 In addition, an adjustable dimming control device may be provided inside the housing 102 and outside the reflective enclosure member 130 that houses the circuit board 246. The adjustable control device may be interconnected with a NEMA ambient light sensor and/or dimming leads of the driver circuit and may control the driver circuit 110. The adjustable dimming control device may include a resistive network and a wiper that is movable to various points in the resistive network. An installer may operate (i.e., turn) an adjustment knob or another adjustment apparatus of the control device operatively connected to the wiper to a position that causes the resistive network to develop a signal that commands the output brightness of the luminaire 100 to be limited to no more than a particular level or magnitude, even if the sensor is commanding a luminaire brightness greater than the limited level or magnitude.

If necessary or desirable, the volume of the reflective enclosure member 130 may be increased or decreased to properly accommodate the driver circuit 110 and to permit the driver circuit to operate with adequate cooling. The details of the parts forming the reflective enclosure member 130 may be varied as desired to minimize material while providing adequate strength.

Further, any of the embodiments disclosed herein may include a power circuit having a buck regulator, a boost regulator, a buck-boost regulator, a SEPIC power supply, or the like, and may comprise a driver circuit as disclosed in U.S. patent application Ser. No. 14/291,829, filed May 30, 2014, entitled "High Efficiency Driver Circuit with Fast Response" by Hu et al. or U.S. patent application Ser. No. 14/292,001, filed May 30, 2014, entitled "SEPIC Driver Circuit with Low Input Current Ripple" by Hu et al. incorporated by reference herein. The circuit may further be used with light control circuitry that controls color temperature of any of the embodiments disclosed herein in accordance with user input such as disclosed in U.S. patent application Ser. No. 14/292,286, filed May 30, 2014, entitled "Lighting Fixture Providing Variable CCT" by Pope et al. incorporated by reference herein.

Any of the embodiments disclosed herein may include one or more communication components forming a part of the light control circuitry, such as an RF antenna that senses RF energy. The communication components may be included, for example, to allow the luminaire to communicate with other luminaires and/or with an external wireless controller, such as disclosed in U.S. patent application Ser. No. 13/782,040, filed Mar. 1, 2013, entitled "Lighting Fixture for Distributed Control" or U.S. provisional application No. 61/932,058, filed Jan. 27, 2014, entitled "Enhanced Network Lighting" both owned by the assignee of the present application and the disclosures of which are incorporated by reference herein. More generally, the control circuitry includes at least one of a network component, an RF component, a control component, and a sensor. The sensor, such as a knob-shaped sensor, may provide an indication of ambient lighting levels thereto and/or occupancy within the room or illuminated area. Such sensor may be integrated into the light control circuitry.

As noted above, any of the embodiments disclosed herein can be used in many different applications, for example, a parking lot light, a roadway light, a light that produces a wall washing effect, a light usable in a large structure, such as a warehouse, an arena, a downlight, etc. A luminaire as disclosed herein is particularly adapted to develop high intensity light greater than 1000 lumens, and more particularly greater than 10,000 lumens, and can even be configured to develop 35,000 or more lumens by adding LED elements and, possibly, other similar, identical or different waveguide bodies with associated LEDs in a luminaire.

The placement of multiple LED element(s) and the optics of the waveguide bodies overlay the illumination from each LED element onto each other, which further helps color mixing while maintaining a desired photometric distribution. If necessary or desirable, color mixing may be enhanced by using any of the structures or cavities disclosed in co-pending applications U.S. patent application Ser. No. 14/101,086, filed Dec. 9, 2013, entitled "Optical Waveguides and Luminaires Incorporating Same," U.S. patent application Ser. No. 14/101,132, filed Dec. 9, 2013, entitled "Waveguide Bodies Including Redirection Features and Methods of Producing Same," U.S. patent application Ser. No. 14/101,147, filed Dec. 9, 2013, entitled "Luminaire Using Waveguide Bodies and Optical Elements", and U.S. patent application Ser. No. 14/101,051, filed Dec. 9, 2013, entitled "Optical Waveguide and Lamp Including Same", owned by the assignee of the present application and filed herewith, the disclosures of which are incorporated by reference herein. If desired, any of the features disclosed in co-pending U.S. patent application Ser. No. 13/839,949 and/or U.S. patent application Ser. No. 13/840,563, may be used in the luminaire 100 as desired.

Further, any LED chip arrangement and/or orientation as disclosed in U.S. patent application Ser. No. 14/101,147, filed Dec. 9, 2013, entitled "Luminaire Using Waveguide Bodies and Optical Elements", incorporated by reference herein and owned by the assignee of the present application, may be used in the devices disclosed herein. Where two LED elements are used in each light coupling cavity (as in the illustrated embodiments), it may be desired to position the LEDs elements within or adjacent the coupling cavity along a common vertical axis or the LED elements may have different angular orientations, as desired. The orientation, arrangement, and position of the LEDs may be different or identical in each waveguide body section of a waveguide as desired. Still further, each light coupling cavity may be cylindrical or non-cylindrical and may have a substantially flat shape, a segmented shape, an inclined shape to direct light out a particular side of the waveguide body, etc.

INDUSTRIAL APPLICABILITY

When one uses a relatively small light source which emits into a broad (e.g., Lambertian) angular distribution (common for LED-based light sources), the conservation of etendue, as generally understood in the art, requires an optical system having a large emission area to achieve an asymmetric angular light distribution. In the case of parabolic reflectors, a large optic is thus generally required to achieve high levels of collimation. In order to achieve a large emission area in a more compact design, the prior art has relied on the use of Fresnel lenses, which utilize refractive optical surfaces to direct and collimate the light. Fresnel lenses, however, are generally planar in nature, and are therefore not well suited to re-directing high-angle light emitted by the source, leading to a loss in optical efficiency. In contrast, in the present invention, light is coupled into the optic, where primarily TIR is used for re-direction and light distribution. This coupling allows the full range of angular emission from the source, including high-angle light, to be re-directed, resulting in higher optical efficiency in a more compact form factor.

While specific coupling features and extraction feature parameters including shapes, sizes, locations, orientations relative to a light source, materials, etc. are disclosed as embodiments herein, the present invention is not limited to the disclosed embodiments, inasmuch as various combinations and all permutations of such parameters are also specifically contemplated herein. Any of the features such as various shaped coupling cavities, LED elements, redirection features, extraction features, etc. described and/or claimed in U.S. patent application Ser. No. 13/842,521, U.S. patent application Ser. No. 13/839,949, U.S. patent application Serr. No. 13/841,074, filed Mar.15, 2013, entitled "Optical Waveguide Body", U.S. patent application Ser. No. 13/840, 563, U.S. patent application Ser. No. 14/101,086, filed Dec. 9, 2013, entitled "Optical Waveguides and Luminaires Incorporating Same", U.S. patent application Ser. No. 14/101,132, filed Dec. 9, 2013, entitled "Waveguide Bodies Including Redirection Features and Methods of Producing Same,", U.S. patent application Ser. No. 14/101,147, filed Dec. 9, 2013, entitled "Luminaire Using Waveguide Bodies and Optical Elements", U.S. patent application Ser. No. 14/101,129, filed Dec. 9, 2013, entitled "Simplified Low Profile Module with Light Guide for Pendant, Surface Mount, Wall Mount and Stand Alone Luminaires", and U.S. patent application Ser. No. 14/101,051, filed Dec. 9, 2013, entitled "Optical Waveguide and Lamp Including Same", International Application No. PCT/US14/13931, filed Jan. 30, 2014, entitled "Optical Waveguides and Luminaires Incorporating Same", and International Application No. PCT/US14/030017, filed Mar. 15, 2014, entitled "Optical Waveguide Body" incorporated by reference herein and owned by the assignee of the present application may be used in a luminaire, either alone or in combination with one or more additional elements, or in varying combination(s) to obtain light mixing and/or a desired light output distribution. Thus, for example, any of the luminaires disclosed herein disclosed herein may include one or more waveguide bodies including coupling features, one or more light redirection features, one or more extraction features or optics, and/or particular waveguide body shapes and/or configurations as disclosed in such applications, as necessary or desirable. Other waveguide body form factors and luminaires incorporating such waveguide bodies are also contemplated.

At least some of the luminaires disclosed herein are particularly adapted for use in installations, such as outdoor products (e.g., streetlights, high-bay lights, canopy lights) preferably requiring a total luminaire output of at least about 2,000 lumens or greater, and, in some embodiments, a total luminaire output of up to about 10,000 lumens, and, in other embodiments, a total lumen output from about 10,000 lumens to about 23,000 lumens. Further, the luminaires disclosed herein preferably develop a color temperature of between about 2500 degrees Kelvin and about 6200 degrees Kelvin, and more preferably between about 3000 degrees Kelvin and about 6000 degrees Kelvin, and, in some embodiments, between about 3,500 degrees Kelvin and about 4,500 degrees Kelvin. Also, at least some of the luminaires disclosed herein preferably exhibit an efficacy of at least about 90 lumens per watt, and more preferably at least about 100 lumens per watt, and more preferably, at least about 110 lumens per watt, and more preferably, about 115 lumens per watt. Also, at least some of the luminaires disclosed herein exhibit an efficacy of about 115 lumens per watt or greater. Further, at least some of the waveguide bodies used in the luminaires disclosed herein preferably exhibit an overall efficiency (i.e., light extracted out of the waveguide body divided by light injected into the waveguide body) of at least about 90 percent. A color rendition index (CRI) of at least about 80 is preferably attained by at least some of the luminaires disclosed herein, with a CRI of at least about 85 being more preferable. The luminaires disclosed herein produce a scotopic to photopic (S/P) ratio of at least 1.4, preferably at least 2.0. Any desired form factor and particular output light distribution, including up and down light distributions or up only or down only distributions, etc. may be achieved.

Embodiments disclosed herein are capable of complying with improved operational standards as compared to the prior art as follows:

| | State of the art standards | Improved standards achievable by present embodiments |
| --- | --- | --- |
| Input coupling efficiency (coupling + waveguide body) | 90% | About 95% plus improvements through color mixing, source mixing, and control within the waveguide body |
| Output efficiency (extraction) | 90% | About 95%: improved through extraction efficiency plus controlled distribution of light from the waveguide body |
| Total system | ~80% | About 90%: great control, many choices of output distribution |

In certain embodiments, the waveguide bodies used in the luminaires disclosed herein may generally taper from a central portion to an outside edge thereof so that substantially all light is extracted during a single pass of each light ray from the LED element(s) to the outer edge of the waveguide body. This extraction strategy maximizes the incidence of light rays impinging on an outer side of each extraction feature and being reflected out a surface (or surfaces) of the waveguide body in a controlled manner, as opposed to striking other surfaces at an angle greater than the critical angle and escaping as uncontrolled light. The outer sides of the extraction features are accurately formed so that control is maintained over the direction of extracted light, thereby allowing a high degree of collimation. Still further, the waveguide body is very low profile, leaving more room for heat exchanger structures, driver components, and the like in the luminaire. Also, glare is reduced as compared with other lamps using LED light sources because light is directed outwardly in the waveguide body while being extracted from the waveguide body by the extraction features such that the resulting emitted light is substantially mixed and substantially uniformly distributed throughout the beam angle. The result is a light distribution that is pleasing and particularly useful for general illumination and other purposes using a light source, such as one or more LED element(s).

In some embodiments, one may wish to control the light rays such that at least some of the rays are collimated, but in the same or other embodiments, one may also wish to control other or all of the light rays to increase the angular dispersion thereof so that such light is not collimated. In some embodiments, one might wish to collimate to narrow ranges, while in other cases, one might wish to undertake the opposite. Any of these conditions may be satisfied by the luminaires utilizing waveguide bodies disclosed herein through appropriate modification thereof.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not be taken as limiting the scope of the disclosure.

We claim:

1. An optical waveguide, comprising:
   a plurality of coupling cavities comprising differing shapes for directing light into a waveguide body; wherein the plurality of coupling cavities are spaced from a particular point and the shape of each of the coupling cavities comprises a dimension that varies with distance from the particular point;
   wherein for each coupling cavity at least one LED element is disposed adjacent the respective coupling cavity and aligned therewith;
   wherein the optical waveguide extends in an x-dimension and a y-dimension orthogonal to the x-dimension, wherein the particular point lies on a particular line extending parallel to the y-dimension, and the waveguide body is divided in the x-dimension by the particular line to define at least first and second portions of the waveguide body; and
   wherein the plurality of coupling cavities is disposed on one of the first and second portions and a further plurality of coupling cavities is disposed on another of the first and second portions.

2. The optical waveguide of claim 1, wherein first and second pluralities of LED elements are aligned with the at least two pluralities of coupling cavities for coupling light into the waveguide body; and
   further comprising at least one planar surface disposed between the plurality of coupling cavities and the further plurality of coupling cavities wherein LED elements are only aligned adjacent the plurality of coupling cavities and the further plurality of coupling cavities.

3. The optical waveguide of claim 1, wherein each of the at least first and second portions is divided by second and third particular lines, respectively; and
   wherein the dimension of each cavity of the pluralities of coupling cavities varies with distance from the second particular line and third particular line on the at least first and second portions, respectively.

4. The optical waveguide of claim 3, wherein each of the coupling cavities comprises a surface with a shape that is at least partially parabolic; and wherein the dimension that varies in dependence upon distance from the particular point is a focal length of each coupling cavity.

5. The optical waveguide of claim 4, wherein coupling cavities having the shortest focal length are proximal the particular point.

6. The optical waveguide of claim 1, further comprising at least one planar surface disposed between the plurality of coupling cavities and a further plurality of coupling cavities, and further comprising an indentation in the at least one planar surface disposed substantially equidistantly between the pluralities of coupling cavities.

7. The optical waveguide of claim 6, further comprising at least one light redirection feature for redirecting light in the waveguide body, wherein the at least one light redirection feature extends at an oblique angle to the at least one planar surface.

8. The optical waveguide of claim 1, further comprising a first light extraction feature aligned with a first subset of the plurality of coupling cavities for extracting light out of the optical waveguide in a first direction, a light redirection feature aligned with a second subset of the plurality of coupling cavities for redirecting light in the optical waveguide, and a second light extraction feature for extracting light out of the optical waveguide in a second direction different than the first direction.

9. The optical waveguide of claim 1, wherein the coupling cavities of the further plurality comprise a dimension that varies with distance from the particular point.

10. An optical waveguide extending in orthogonal x- and y-dimensions, comprising:
    a waveguide body of the optical waveguide that couples with a plurality of LED elements along the x-dimension;
    at least one light extraction member extending in the x-dimension for extracting light out of the waveguide body;
    at least one plurality of abutting light extraction members extending in the y-dimension for extracting light out of the waveguide body; and
    at least one plurality of light extraction members extending in the x-dimension parallel to the at least one light extraction member and spaced from the at least one plurality of abutting light extraction members extending in the y-dimension;
    wherein each of the light extraction members of the at least one plurality of abutting light extraction members extends an entire length of the waveguide body and divides the at least one light extraction member extending in the x-dimension.

11. The optical waveguide of claim 10, further comprising:
    at least two pluralities of coupling cavities for directing light into the waveguide body disposed on either side of a particular line wherein the coupling cavities of at least one of the pluralities of cavities comprise a dimension that varies in dependence upon distance from the particular line;
    wherein the particular line divides the waveguide body into at least first and second portions; and
    wherein at least one of the pluralities of coupling cavities is disposed on each of the at least first and second portions.

12. The optical waveguide of claim 11, wherein first and second pluralities of LED elements are aligned with the at least two pluralities of coupling cavities for coupling light into the waveguide body.

13. The optical waveguide of claim 11, wherein each of the at least first and second portions are divided by second and third particular lines; and
    wherein the dimension of each of the coupling cavities of the at least two pluralities of coupling cavities varies in dependence upon distance from the second and third particular line on the respective first and second portions.

14. The optical waveguide of claim 11, further comprising at least one planar surface that separates the at least two pluralities of coupling cavities; and
    wherein the at least one planar surface is substantially aligned with the at least one plurality of adjacent light extraction members.

15. The optical waveguide of claim 14, wherein the at least one planar surface and the at least one light extraction member extending in the x-dimension form opposing end surfaces of the at least one plurality of adjacent light extraction members extending in the y-dimension.

16. An optical waveguide extending in orthogonal x- and y-dimensions, comprising:
    at least one first light extraction member extending in the x-dimension for extracting light out of a waveguide body;
    at least one plurality of light extraction members extending in the y-dimension for extracting light out of the waveguide body;
    at least first and second portions of the waveguide body disposed on either side of the plurality of light extraction members;
    a plurality of light redirection features extending transverse to the at least one plurality of light extraction members and the at least one first light extraction member;
    first and second pluralities of coupling cavities disposed on the respective at least first and second portions of the waveguide body;
    wherein an end surface of each of the at least one plurality of light extraction members forms a portion of the at least one first light extraction member;
    wherein the plurality of light redirection features are disposed on both the at least one plurality of light extraction members and the at least first and second portions of the waveguide body; and
    wherein the at least one first light extraction member is disposed at an end of the optical waveguide opposite a coupling end surface.

17. The optical waveguide of claim 16, further comprising:
    at least two pluralities of coupling cavities for directing light into the waveguide body disposed on either side of a particular line wherein coupling cavities of at least one of the pluralities of coupling cavities comprise a dimension that varies in dependence upon distance from the particular line.

18. The optical waveguide of claim 17, wherein the coupling cavities comprise a surface with a shape that is at least partially parabolic; and
    wherein the dimension that varies in dependence upon distance from the particular line is a focal length of each coupling cavity.

19. The optical waveguide of claim 17, wherein the dimension is a depth that each coupling cavity extends into the waveguide body.

20. An optical waveguide, comprising:
    a plurality of coupling cavities for coupling light into a waveguide body from a plurality of LED elements;
    a first light extraction feature that extracts light directly out of and away from the waveguide body in a first direction; and
    at least one light redirection feature that redirects light in the waveguide body, and a second light extraction feature that extracts redirected light out of and away from the waveguide body in a second direction different than the first direction;
    wherein the at least one light redirection feature is a cavity comprising a linear extent transverse to the first light extraction feature, the second light extraction feature, and a first surface of the waveguide body comprising the plurality of coupling cavities;
    wherein the first light extraction feature and the second light extraction feature are disposed on a second surface of the waveguide body; and
    wherein the light extracted in the first direction and the second direction exits a third surface of the waveguide body opposite the second surface.

* * * * *